US010120909B2

(12) United States Patent
Himel et al.

(10) Patent No.: US 10,120,909 B2
(45) Date of Patent: Nov. 6, 2018

(54) GENERATING CARDS IN RESPONSE TO USER ACTIONS ON ONLINE SOCIAL NETWORKS

(71) Applicant: Facebook, Inc., Menlo Park, CA (US)

(72) Inventors: Alex Himel, San Francisco, CA (US); Matej Hrescak, Palo Alto, CA (US); Samuel Wharton Lessin, San Francisco, CA (US); Matthew D. Wyndowe, New York, NY (US); Henry Zheng Zhang, Edison, NJ (US)

(73) Assignee: Facebook, Inc., Menlo Park, CA (US)

( * ) Notice: Subject to any disclaimer, the term of this patent is extended or adjusted under 35 U.S.C. 154(b) by 818 days.

(21) Appl. No.: 14/466,269

(22) Filed: Aug. 22, 2014

(65) Prior Publication Data

US 2016/0055160 A1 Feb. 25, 2016

(51) Int. Cl.
 *G06F 17/30* (2006.01)
(52) U.S. Cl.
 CPC .... *G06F 17/3053* (2013.01); *G06F 17/30554* (2013.01); *G06F 17/30958* (2013.01)
(58) Field of Classification Search
 CPC ......... G06F 17/30286; G06F 17/30958; G06F 17/3053
 USPC ........................................ 707/728, 737, 749
 See application file for complete search history.

(56) References Cited

U.S. PATENT DOCUMENTS

| | | | |
|---|---|---|---|
| 6,539,232 B2 | 3/2003 | Hendrey | |
| 6,957,184 B2 | 10/2005 | Schmid | |
| 7,069,308 B2 | 6/2006 | Abrams | |
| 7,539,697 B1 | 5/2009 | Akella | |
| 7,752,326 B2 | 7/2010 | Smit | |
| 7,836,044 B2 | 11/2010 | Kamvar | |
| 8,027,990 B1 | 9/2011 | Mysen | |
| 8,060,639 B2 | 11/2011 | Smit | |
| 8,112,529 B2 | 2/2012 | Van Den Oord | |
| 8,180,804 B1 | 5/2012 | Narayanan | |
| 8,185,558 B1 | 5/2012 | Narayanan | |
| 8,239,364 B2 | 8/2012 | Wable | |
| 8,244,848 B1 | 8/2012 | Narayanan | |

(Continued)

OTHER PUBLICATIONS

Josh Constine, Facebook for iOS Tries Popping Up Cards of Related Content to Browse After You Post, http://techcrunch.com/2014/05/14/facebook-now/.

*Primary Examiner* — Monica Pyo
(74) *Attorney, Agent, or Firm* — Baker Botts L.L.P.

(57) ABSTRACT

In one embodiment, a method includes accessing a social graph by a social-networking system. The social graph includes a plurality of nodes and a plurality of edges connecting the nodes. The social-networking system may receive a trigger action from a first user. In response to the trigger action, the social-networking system may generate reaction-cards based at least in part on the trigger action where each reaction-card is associated with a structured query referencing nodes and edges of the social graph. The social-networking system may calculate a reaction-card score for each reaction-card, where the reaction-card score is based on a relevance of the structured query associated with the reaction-card to the trigger action and user-engagement factors. The social-networking system may then send each reaction-card having a reaction-card score greater than a threshold reaction-card score to the first user for display on a page currently accessed by the first user.

43 Claims, 10 Drawing Sheets

(56) References Cited

U.S. PATENT DOCUMENTS

| | | |
|---|---|---|
| 8,271,471 B1 | 9/2012 | Kamvar |
| 8,271,546 B2 | 9/2012 | Gibbs |
| 8,301,639 B1 | 10/2012 | Myllymaki |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,595,297 B2 | 11/2013 | Marcucci |
| 8,601,027 B2 | 12/2013 | Behforooz |
| 8,732,208 B2 | 5/2014 | Lee |
| 8,751,521 B2 | 6/2014 | Lee |
| 8,782,080 B2 | 7/2014 | Lee |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0255237 A1 | 12/2004 | Tong |
| 2005/0131872 A1 | 6/2005 | Calbucci |
| 2005/0171955 A1 | 8/2005 | Hull |
| 2006/0136419 A1 | 6/2006 | Brydon |
| 2007/0094042 A1* | 4/2007 | Ramer .............. G06F 17/30867 705/1.1 |
| 2007/0277100 A1 | 11/2007 | Sheha |
| 2008/0072180 A1 | 3/2008 | Chevalier |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0281988 A1 | 11/2009 | Yoo |
| 2009/0299963 A1 | 12/2009 | Pippori |
| 2010/0049802 A1 | 2/2010 | Raman |
| 2010/0228744 A1 | 9/2010 | Craswell |
| 2010/0235354 A1 | 9/2010 | Gargaro |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0191371 A1 | 8/2011 | Elliott |
| 2011/0196855 A1 | 8/2011 | Wable |
| 2011/0276396 A1 | 11/2011 | Rathod |
| 2011/0313992 A1 | 12/2011 | Groeneveld |
| 2012/0059708 A1 | 3/2012 | Galas |
| 2012/0102050 A1* | 4/2012 | Button .................. G06N 5/043 707/749 |
| 2012/0136852 A1 | 5/2012 | Geller |
| 2012/0166432 A1 | 6/2012 | Tseng |
| 2012/0179637 A1 | 7/2012 | Juan |
| 2012/0185486 A1 | 7/2012 | Voigt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0311034 A1 | 12/2012 | Goldband |
| 2013/0031106 A1 | 1/2013 | Schechter |
| 2013/0041876 A1 | 2/2013 | Dow |
| 2013/0066876 A1 | 3/2013 | Raskino |
| 2013/0086057 A1 | 4/2013 | Harrington |
| 2013/0124538 A1 | 5/2013 | Lee |
| 2013/0124542 A1 | 5/2013 | Lee |
| 2013/0144899 A1 | 6/2013 | Lee |
| 2013/0159112 A1* | 6/2013 | Schultz ................ G06Q 30/02 705/14.66 |
| 2013/0191372 A1 | 7/2013 | Lee |
| 2013/0191416 A1 | 7/2013 | Lee |
| 2013/0226918 A1 | 8/2013 | Berkhim |
| 2013/0246404 A1* | 9/2013 | Annau ............. G06F 17/30672 707/723 |
| 2015/0019553 A1* | 1/2015 | Shaashua ......... G06F 17/30705 707/737 |

* cited by examiner

GENERATING CARDS IN RESPONSE TO USER ACTIONS ON ONLINE SOCIAL NETWORKS

TECHNICAL FIELD

This disclosure generally relates to social graphs and performing searches for objects within a social-networking environment or related environments.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual users within the networks, and edges represent the relationships between the users. The resulting graph-based structures are often very complex. In its simplest form, a social graph is a map of all of the relevant edges between all the nodes being studied.

A mobile computing device-such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area network (WLAN) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a social-networking system may generate reaction-cards in response to a first user's trigger action associated with an online social network. The social-networking system may access a social graph associated with the online social network. The social-graph may comprise a plurality of nodes and a plurality of edges connecting the nodes. Each of the edges between the two nodes may represent a single degree of separation between them. The nodes may comprise a first user node corresponding to the first user associated with the online social network and a plurality of second nodes (one or more user nodes, concepts nodes, or any combination thereof) that each may correspond to a concept or a second user associated with the online social network.

In particular embodiments, the social-networking system may receive a trigger action from the first user of the online social network. The trigger action may comprise a post, a comment, a check-in, a like, share, or any other suitable user's action associated with the social-networking system. As an example, in response to the user's trigger action, the social-networking system may create an edge between the user node corresponding to the user and a second node in social graph. In response to the user's trigger action, the social-networking system may generate a plurality of reaction-cards based at least in part on the trigger action. Each reaction-card may be associated with a structured query referencing one or more of user node, concept node, and edge of the social graph. Furthermore, each reaction-card may comprise references to one or more second nodes of the plurality of second nodes, respectively, matching the structured query associated with the reaction-card. The social-networking system may calculate a reaction-card score for each reaction-card. As an example, the reaction-card score for each reaction-card may be based at least in part on a relevance of the structured query associated with the reaction-card to the trigger action. As another example, the reaction-card score for each reaction-card may be based on one or more user-engagement factors. In particular embodiments, the social-networking system may send, in response, to receiving the trigger action from the first user, each reaction-card having a reaction-card score greater than a threshold reaction-card score to the first user for display on a page currently accessed by the first user. The reaction-cards may offer particular benefits for the first user. As an example, it may inspire conversations with the people around the first user of the online social network. As another example, it may help the first user to discover where to go or what to do next in response to the first user's trigger action.

The embodiments disclosed above are only examples, and the scope of this disclosure is not limited to them. Particular embodiments may include all, some, or none of the components, elements, features, functions, operations, or steps of the embodiments disclosed above.

DESCRIPTION OF EXAMPLE EMBODIMENTS

System Overview

Figure 1:
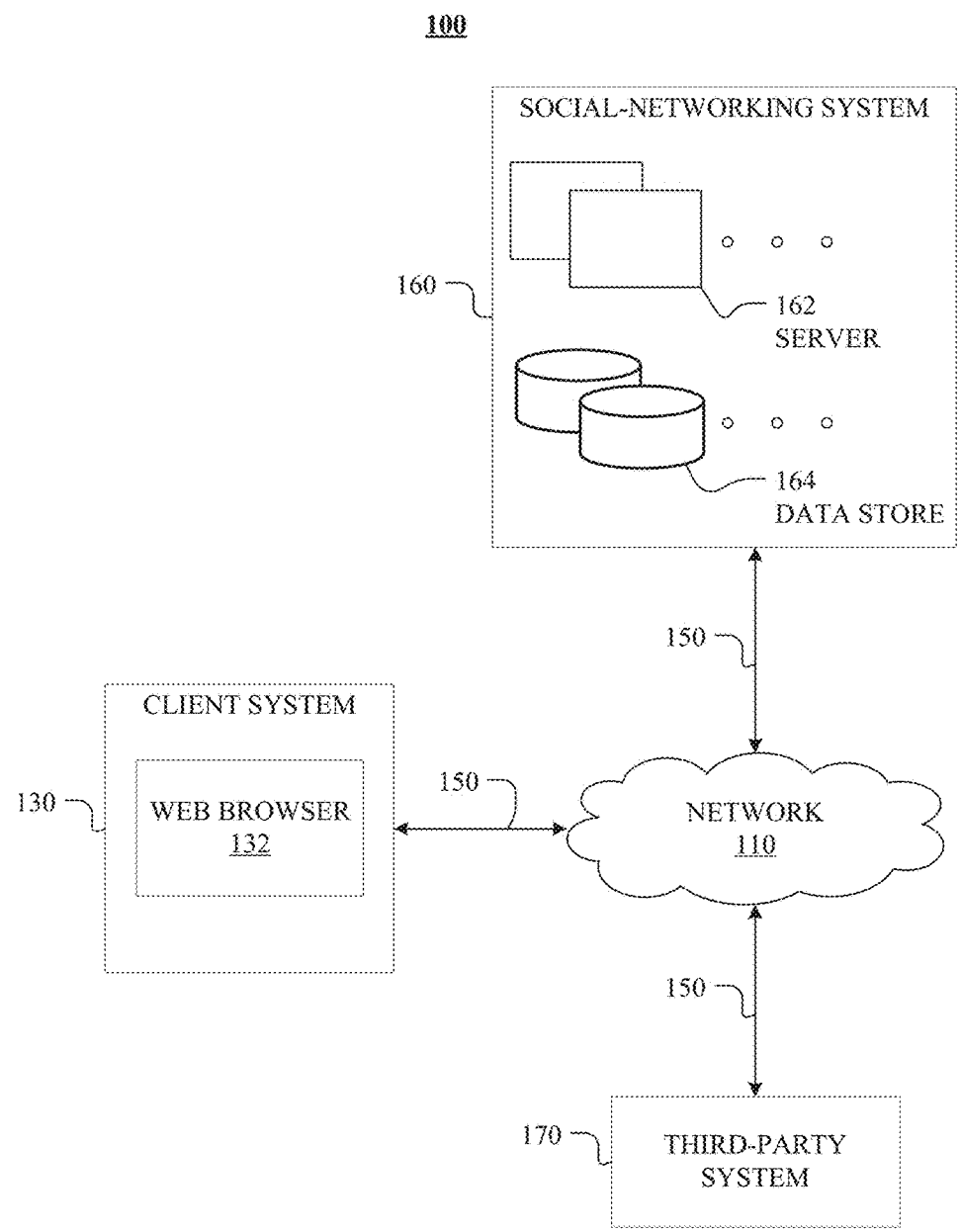
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable page files, including webpages or pages presented as a user interface of a native application. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational database.

Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Social Graphs

Figure 2:
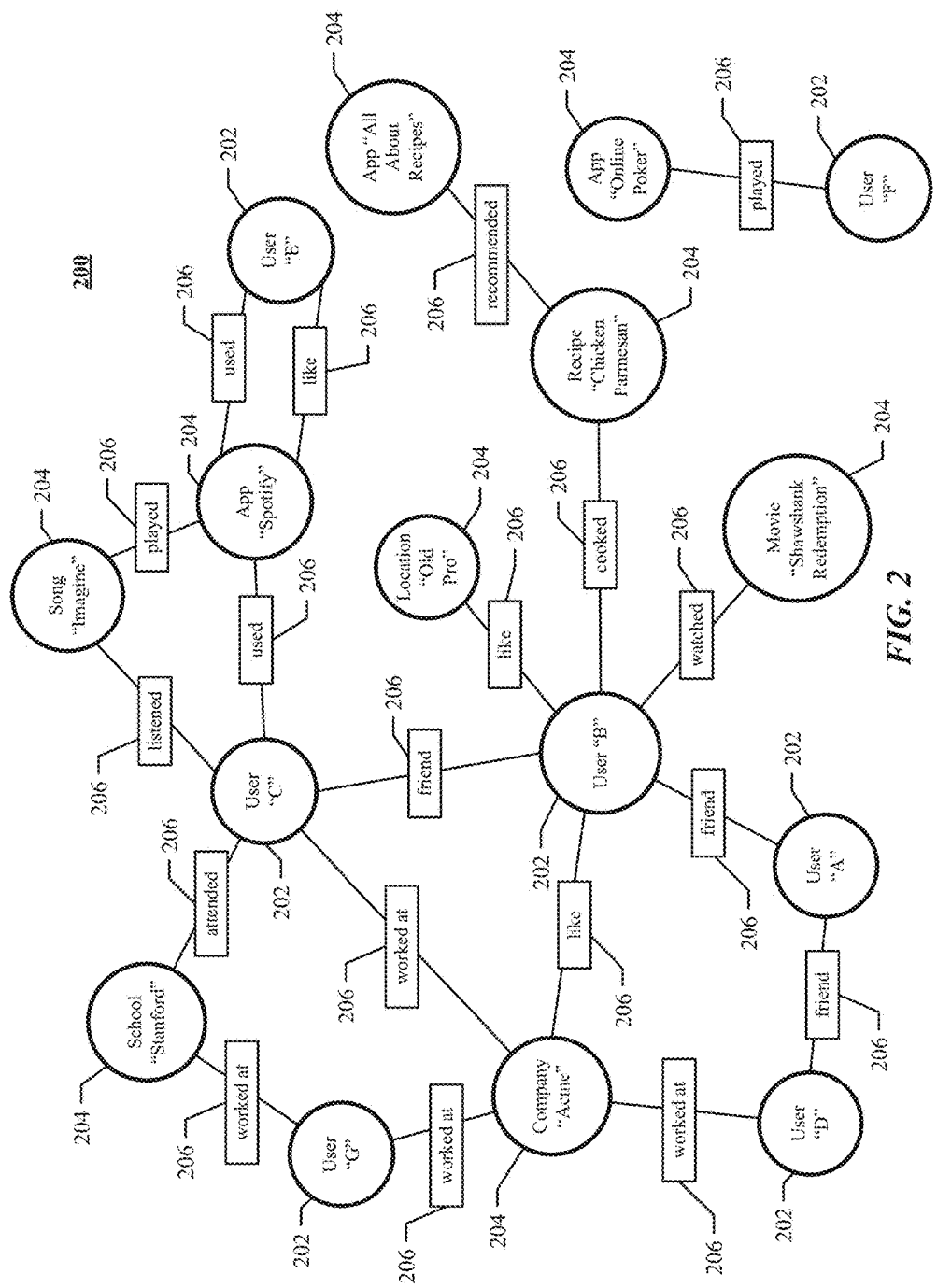
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more pages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-networking system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server, real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more pages.

In particular embodiments, a node in social graph 200 may represent or be represented by a page (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP code) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge)

between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Mobile Client Systems

Figure 3:
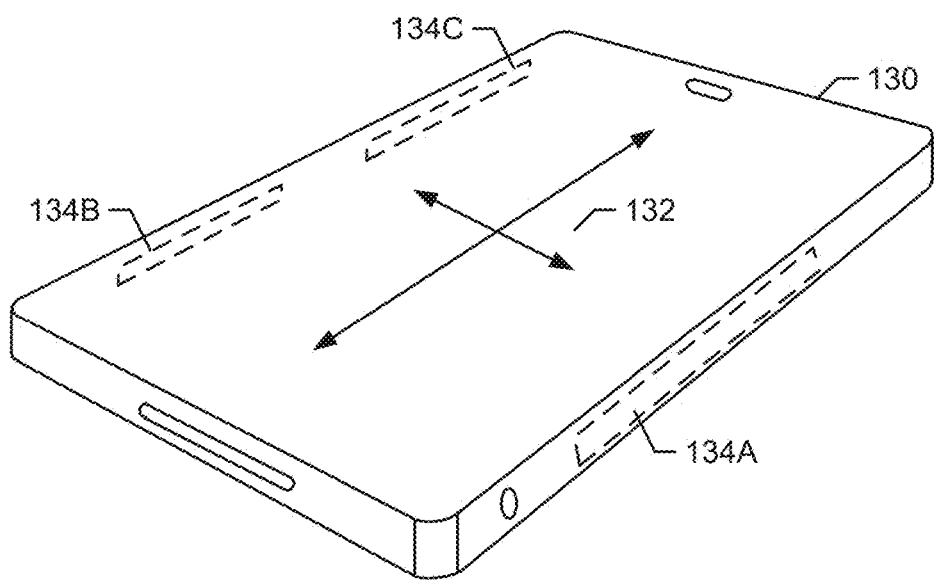
FIG. 3 illustrates an example mobile client system.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a touch sensor 132 as an input component. In the example of FIG. 3, touch sensor 132 is incorporated on a front surface of mobile client system 130. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 134A-C may be incorporated into one or more sides of mobile client system 130. Antennae 134A-C are components that convert electric current into radio waves, and vice versa. During transmission of signals, a transmitter applies an oscillating radio frequency (RF) electric current to terminals of antenna 134A-C, and antenna 134A-C radiates the energy of the applied the current as electromagnetic (EM) waves. During reception of signals, antennae 134A-C convert the power of an incoming EM wave into a voltage at the terminals of antennae 134A-C. The voltage may be transmitted to a receiver for amplification.

In particular embodiments, mobile client system 130 many include a communication component coupled to antennae 134A-C for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 130 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 134A-C mobile client system 130 may determine location data based on global positioning system (GPS) signals, cellular triangulation, wireless hotspots, Bluetooth beacons, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a pre-determined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection. In connection with determining a user's location particular embodiments may utilize one or more systems, components, elements, functions, methods, operations, or steps disclosed in U.S. patent application Ser. No. 13/930,321, filed 28 Jun. 2013 and U.S. patent application Ser. No. 13/930,347, filed 28 Jun. 2013 which are incorporated by reference.

Generating Cards in Response to User Actions

In particular embodiments, social-networking system 160 may generate personalized recommendations of objects that correspond to particular nodes of social graph 200. Herein, reference to a suggested query may refer to a search query with one or more search terms auto-populated with information. Herein, reference to a query-domain may refer to a logical grouping of content objects related to a particular category. The categories may be associated at least with places, people, groups, applications, ratings/reviews, events, photos, or any other suitable things around a user. As an example and not by way of limitation, social-networking system 160 may generate a suggested query for a user as one or more structured queries, unstructured queries, or any combination thereof. As another example and not by way of limitation, social-networking system 160 may generate one or more reaction-cards that reference one or more search results of the suggested query. In particular embodiments, social-networking system 160 may generate and display recommendations in the form of reaction-cards that are personalized or relevant to the user in response to the user performing a particular trigger action on the online social network. One or more reaction-card clusters may be sent to a user in response to various trigger actions, such as posts, comments, check-ins, likes, shares, or other suitable user's actions associated with the online social network. Although this disclosure describes generating a suggested query in a particular manner, this disclosure contemplates generating the suggested query in any suitable manner.

Generating Search Queries

In response to text entered into a text field (for example, text field 550) by the user, social-networking system 160 may identify portions of the text that may correspond to particular social-graph elements. However, in some cases the text entered into the text field may include one or more terms that are ambiguous, where an ambiguous term is a term that may possibly correspond to multiple social-graph elements. To parse the ambiguous term, social-networking system 160 may access a social graph 200 and then parse the text to identify the social-graph elements that corresponded to ambiguous n-grams from the text query. As an example and not by way of limitation, the user may enter unstructured text "friends stanford" into a text field. As the querying user enters this unstructured text into the text field, social-networking system 160 may modify the suggested query to include structured queries incorporating the unstructured text. In particular embodiments, the suggested query may take the form of one or more structured queries auto-populated to include information relevant to the user, such as for example current or user profile information. The text may, of course, be structured with respect to standard language/grammar rules (e.g. English language grammar). However, the text will ordinarily be unstructured with respect to social-graph elements. In other words, text entered into the text field may not ordinarily include embedded references to particular social-graph elements. Thus, as used herein, a structured query refers to a query that contains references to particular social-graph elements, allowing the search engine to search based on the identified elements. Furthermore, the text may be unstructured with respect to formal query syntax. In other words, the text may not necessarily be in the format of a query command that is directly executable by a search engine (e.g., the text query "friends stanford" could be parsed to form a suggested query command "intersect(school(Stanford University), friends (me)", or "/search/me/friends/[node ID for Stanford University]/students/ever-past/intersect", which could be executed as a suggested query in a social-graph database). With respect to reaction-cards 410, social-networking system 160 may generate reaction-cards 410 that correspond to both typeahead query results and structured query results. As an example and not by way of limitation, social-networking system 160 may generate a first reaction-card 410 corresponding to the results of the typeahead process and second reaction-card 410 corresponding to the query "Friends Nearby," and a third reaction-card 410 corresponding to the results of the structured query "Friends Nearby who went to Stanford." These reaction-cards 410 may then be ranked and filtered as discussed below. Although this disclosure describes receiving particular texts in a particular manner, this disclosure contemplates receiving any suitable texts in any suitable manner. More information on element detection and parsing texts may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference.

In particular embodiments, social-networking system 160 may access a context-free grammar model comprising a plurality of grammars. Each grammar of the grammar model may comprise one or more non-terminal tokens (or "non-terminal symbols") and one or more terminal tokens (or "terminal symbols"/"query tokens"), where particular non-terminal tokens may be replaced by terminal tokens. A grammar model is a set of formation rules for strings in a formal language. In particular embodiments, social-networking system 160 may generate one or more strings using one or more grammars. To generate a string in the language, one begins with a string consisting of only a single start symbol. The production rules are then applied in any order, until a string that contains neither the start symbol nor designated non-terminal symbols is produced. In a context-free grammar, the production of each non-terminal symbol of the grammar is independent of what is produced by other non-terminal symbols of the grammar. The non-terminal symbols may be replaced with terminal symbols (i.e., terminal tokens or query tokens). Some of the query tokens may correspond to identified nodes or identified edges, as described previously. A string generated by the grammar may then be used as the basis for a structured query containing references to the identified nodes or identified edges. The string generated by the grammar may be rendered in a natural-language syntax, such that a structured query based on the string is also rendered in natural language. A context-free grammar is a grammar in which the left-hand side of each production rule consists of only a single non-terminal symbol. A probabilistic context-free grammar is a tuple $\langle \Sigma, N, S, P \rangle$, where the disjoint sets $\Sigma$ and $N$ specify the terminal and non-terminal symbols, respectively, with $S \in N$ being the start symbol. P is the set of productions, which take the form $E \rightarrow \xi(p)$, with $E \in N$, $\xi \in (\Sigma \cup N)^+$, and $p = Pr(E \rightarrow \xi)$, the probability that E will be expanded into the string $\xi$. The sum of probabilities p over all expansions of a given non-terminal E must be one. Although this disclosure describes accessing particular grammars, this disclosure contemplates any suitable grammars. Furthermore, although this disclosure describes generating strings in a particular manner, this disclosure contemplates generating strings in any suitable manner.

In particular embodiments, social-networking system 160 may generate a suggested query that is a structured query. These structured queries may be based on strings generated by a grammar model, such that they are rendered in a natural-language syntax with references to the relevant social-graph elements. In particular embodiments, these structured queries may be ranked based on one or more of information associated with user, the user's trigger action (including, for example, text inputted by the user, references to social-graph entities (e.g., likes, tags, etc.), or other structured data associated with the trigger action), user-engagement factors, other suitable factors, or any combination thereof, to infer from among the structured queries which social-graph element is most relevant to the user, the user's trigger action, and the one or more user-engagement factors. Social-networking system 160 may then lock the ambiguous term in the text to the social-graph element inferred to be most relevant to user, the user's trigger action, and the one or more user-engagement factors, and then generate a new set of structured queries based on the relevant social-graph element. This type of structured query may allow social-networking system 160 to more efficiently search for resources and content related to the online social network (such as, for example, profile pages) by searching for content connected to or otherwise related to the identified user nodes 202 and the identified edges 206. As an example and not by way of limitation, referencing FIG. 5A, in response to the text as entered in text field 550 and posted to the user's wall, "I am watching The Grand Budapest Hotel," social-networking system 160 may generate a suggested query that includes a structured query "Friends who watch The Grand Budapest Hotel," where "Friends who watch" and "The Grand Budapest Hotel" in the structured query are references corresponding to particular social-graph elements. The reference to "Friends" would correspond to friend-type edges 206 connecting a first user node 202 corresponding to the user (where social-networking system 160 has parsed the n-gram "I" to correspond with the first user node 202 corresponding to the user) to second user nodes 202 (i.e., edges 206 connecting to the user's first-degree friends), which are further connected by viewed-type edges 206 to the concept node 204 corresponding to "The Grand Budapest Hotel". Furthermore, the reference to "The Grand Budapest Hotel" would correspond to a particular concept node 204 (where social-networking system 160 has parsed the n-gram "The Grand Budapest Hotel" to correspond with a concept node 204 for the movie "The Grand Budapest Hotel"). When executing this structured query, social-networking system 160 may identify one or more second user nodes 202 connected by friend-type edges 206 to the first user node 202 corresponding to the querying user and connected further by movie-type edges 206 to the concept node 204 corresponding to the movie "The Grand Budapest Hotel". At the same time, social-networking system 160 may generate one or more snippets for each search result corresponding to an identified second user node 202. As an example and not by way of limitation, referencing FIG. 4B, social-networking system 160 may provide for each search result 540A-C the last time each friend (of the user) had watched the movie "The Grand Budapest Hotel". As another example and not by way of limitation, referencing FIG. 4B, in response to the trigger action of checking-in at Yosemite National Park, social-networking system 160 may generate a structured query "My friends' posts at Yosemite National Park," where "My friends," "posts," and "Yosemite National Park" in the structured query are references corresponding to particular social-graph elements (i.e., a friend-type edge 206, a post-type edge 206, and concept node 204 corresponding to the location "Yosemite National Park"). Based on the results of the modified suggested query, social-networking system 160 may add a new reaction-card 410A to incorporate, for example, the posts (post strings) of the matching nodes. These structured queries may be pre-generated and accessed from a cache or generated dynamically in response to input from the user. As another example and not by way of limitation, referencing FIG. 4A, the user may post a message "Happy Birthday Matt!" on the online social network before checking-in at Yosemite National Park. In response to the user's trigger action of posting the message, social-networking system 160 may generate a structured query "My friends having birthdays today," where "My friends" in the structured query is a reference corresponding to particular social-graph elements (i.e., second user nodes 202 corresponding to the friends of the user). Although this disclosure describes generating particular structured queries in a particular manner, this disclosure contemplates generating any suitable structured queries in any suitable manner. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

In particular embodiments, the suggested query may correspond to a phrase with one or more auto-populated search terms and may take the form of an unstructured text query. Social-networking system 160 may then search data store 164 (or, in particular, a social-graph database) to identify content that matches the suggested query. The search engine may conduct a search based on the suggested query phrase using various search algorithms and generate search results that identify resources or content (e.g., user-profile pages, content-profile pages, or external resources) that are most likely to be related to the suggested search query. In response, the search engine may identify one or more resources that are likely to be related to the suggested query. The identified content may include, for example, social-graph elements (e.g., user nodes 202 or concept nodes 204), profile pages, external webpages, or any combination thereof. Identified objects may then be generated as search results, where each search result comprises a reference to an identified object. The search results may then be sent to a client system 130 of the querying user for display (e.g., as part of a search-results page comprising references to one or more of the identified objects, or as part of a reaction-card 410 corresponding to a particular query).

In particular embodiments, social-networking system 160 may score the generated suggested queries. The score may be, for example, a confidence score, a probability, a quality, a ranking, another suitable type of score, or any combination thereof. The suggested queries may be scored based on a variety of factors, such as, for example, the page or type of page the user is accessing, user-engagement factors, business-intelligence data, the predicted click-thru rate (CTR) of particular suggested queries, the conversion-rate of particular suggested queries, user-preferences of the first user, the search history of the first user, advertising sponsorship of particular queries, the first user's social-graph affinity for social-graph elements referenced in particular queries, the inferred intent of the first user, the general or current popularity of particular suggested queries, the usefulness of particular suggested queries, the current geographic location of the first user, the current time, other suitable factors, or any combination thereof. As an example and not by way of limitation, the current time may allow social networking system 160 to identify content on the online social network that are currently trending for the first user. In particular embodiments, the user-engagement factors may comprise one or more of demographic information, current information, or social-graph information of the first user. As an example and not by way of limitation, the current information of the first user may correspond to a location history, one or more personal preferences, or a search history of the first user. The search history of the first user may provide information about particular contents from the social graph 200 that are nostalgic to the first user. As another example and not by way of limitation, the social-graph information of the first user may include the social-graph affinity of the first user with respect to one or more second nodes referenced by the suggested query. As yet another example and not by way of limitation, the current information of the first user may include feedback by the first user on previously-displayed reaction-cards. Social-networking system 160 may provide a user-interface (UI) for the first user to enter positive or negative feedback on previously-displayed reaction-cards. In particular embodiments, the negative feedback may be associated with previously-displayed reaction-cards that may not be interesting or useful to the first user. The positive or negative feedback provided by the first user towards content associated with the previously-displayed reaction-cards may be regarded as user-engagement factors to score future suggested queries. In particular embodiments, the user-engagement factors may comprise social-graph information of a second user in relation to one or more of the second nodes (where the second user has at least a subset of demographic information in common with demographic information of the first user). In particular embodiments, the user-engagement factors may comprise one or more sensor information, current time, or one or more capabilities of the mobile client device of the first user. Although this disclosure describes ranking suggested queries in a particular manner, this disclosure contemplates ranking suggested queries in any suitable manner.

Generating Search Results

In particular embodiments, in response to a suggested query, social-networking system 160 may generate one or more search results, where each search result matches (or substantially matches) the terms of the suggested query. Social-networking system 160 may generate a suggested query based at least in part on information of the user corresponding to a user node 202. In response to the suggested query, social-networking system 160 may generate one or more reaction-cards 410 corresponding to search results of the suggested query. In particular embodiments, reaction-cards 410 corresponding to the search results may be clustered or ranked and sent to the user as a page accessed by a browser client or a UI of a native application. In particular embodiments, social-networking system 160 may generate one or more reaction-cards 410 corresponding to search results of the suggested query. Reaction-cards 410 may include information identifying resources or content (e.g., user-profile pages, content-profile pages, or external resources) that match or are likely to be related to the suggested queries. In particular embodiments, each reaction-card 410 may correspond to one or more of particular user node 202 and particular concept node 204 of social graph 200. Each reaction-card 410 may include one or more links to profile pages associated with the nodes, as well as contextual information about the nodes (i.e., contextual information about the users or concepts that correspond to the nodes). In particular embodiments, each search result may correspond to a node that is connected to one or more of the selected nodes by one or more of the selected edges of the suggested query. In particular embodiments, social-networking system 160 may also transmit advertisements or other sponsored content to the client system 130 in response to the suggested query. The advertisements may be included in as part of reaction-cards 410, or separately. The advertisements may correspond to one or more of the objects referenced in reaction-cards 410. In particular embodiments, social-networking system 160 may filter out one or more reaction-cards 410 identifying particular resources or content based on the privacy settings associated with the users associated with those resources or content. Although this disclosure describes generating particular reaction-cards corresponding to a suggested query in a particular manner, this disclosure contemplates generating any suitable reaction-cards corresponding to any suitable suggested query in any suitable manner. More information on generating search results may be found in U.S. patent application Ser. No. 13/556,017, filed 23 Jul. 2012, U.S. patent application Ser. No. 13/731,939, filed 31 Dec. 2012, and U.S. patent application Ser. No. 14/052,564, filed 11 Oct. 2013, each of which is incorporated by reference.

In particular embodiments, a reaction-card interface may be a visual model of a home screen of an application and one or more content associated with the application executed on mobile client system 130, as described below. As an example and not by way of limitation, a home screen may set one or more settings of the application, such as for example, the background image of the application, or associate particular functions to particular contents associated with the application, such as for example, an image browser. In particular embodiments, mobile client system 130 may use the reaction-card interface to navigate between a home screen and contents of the application. As an example and not by way of limitation, the reaction-card interface may correspond to the graphical user interface (GUI) of the application and may be provided for display on mobile client system 130 in response to a user pressing or actuating the button associated with the application, after switching from another application executed on mobile client system 130, or after completing a phone call on mobile client system 130. As described below, a reaction-card corresponding to a content of the application may be added to the reaction-cards in response to "launching" or executing a trigger action on the application. In particular embodiments, the trigger action comprises a post, a comment, a check-in, a like, share, or any other suitable user's action associated with social-networking system 160. As an example and not by way of limitation, in response to the user's trigger action, social-networking system 160 may create an edge between the user node corresponding to the user and a second node in social graph 200. The trigger action may be associated with or otherwise include references to particular social-graph entities, such as tags, links, check-ins, etc., or other types of structured data associated with the online social network, which may be inputted and/or selected by the user within a composer interface or another suitable user interface. In particular embodiments, the user of mobile client system 130 may navigate between contents of the application through the reaction-cards of the reaction-card interface, as described below.

Generating Reaction-Cards

In particular embodiments, social-networking system 160 may generate and display recommendations in the form of reaction-cards that are personalized or relevant to the user in response to the user performing a particular trigger action on the online social network. In particular embodiments, one or more reaction-card clusters may be sent to a user. Herein, reference to a user-engagement score may refer to a metric for measuring the engagement of a user of the online social network, such as, for example, by engaging with other users, concepts, content, etc. As an example and not by way of limitation, social-networking system 160 may generate one or more reaction-card clusters as part of a native application associated with social-networking system 160 executed on mobile client system 130. In particular embodiments, reaction-cards corresponding to suggested queries may be displayed on a user-interface (UI) of a native application or on a webpage accessed by a browser client on the user's client system 130, as illustrated in FIG. 3. Although this disclosure describes generating personalized recommendations in a particular manner, this disclosure contemplates generating personalized recommendations in any suitable manner.

Figure 4A:
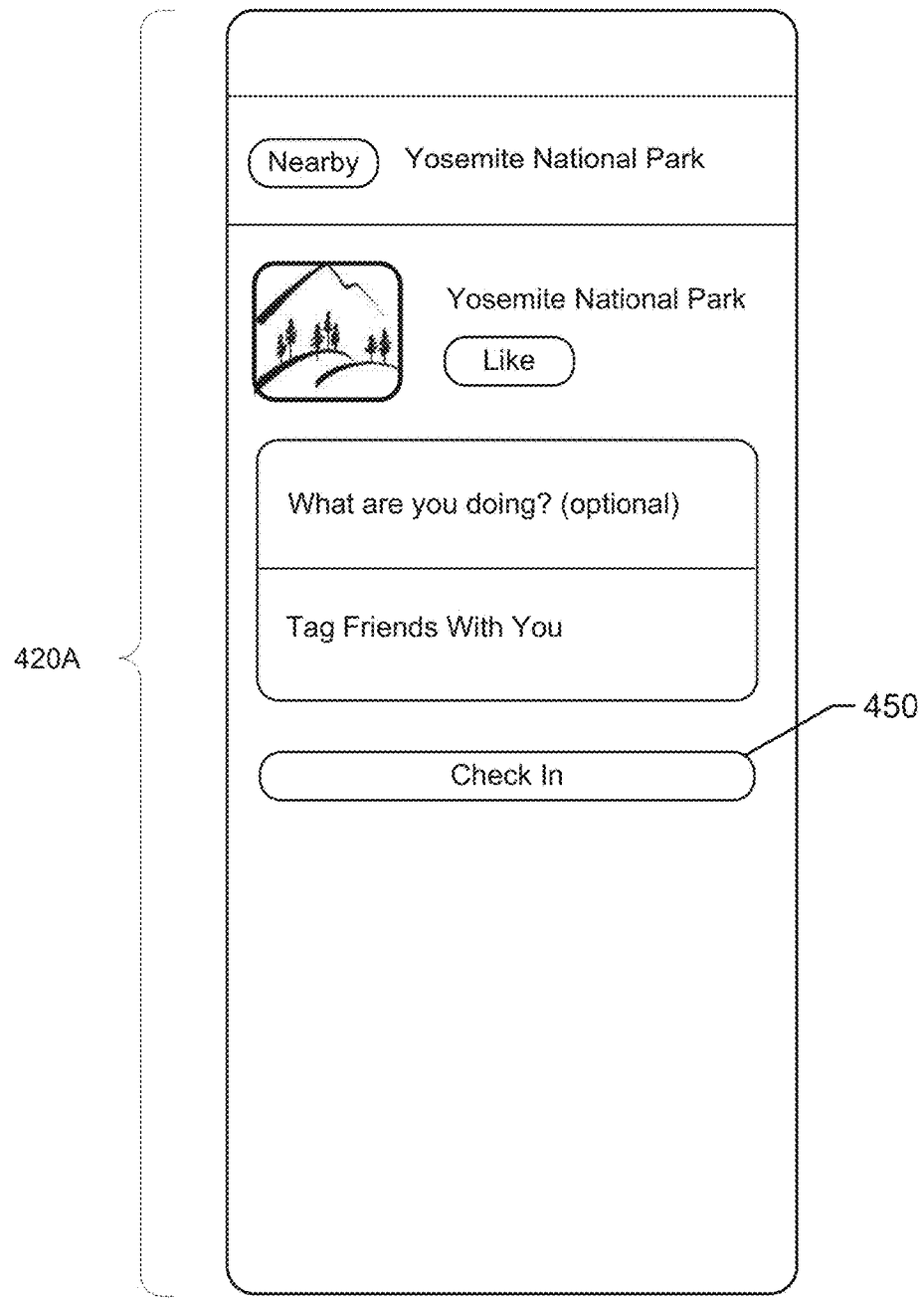
FIG. 4A illustrates an example page for initiating an example trigger action.
Figure 4B:
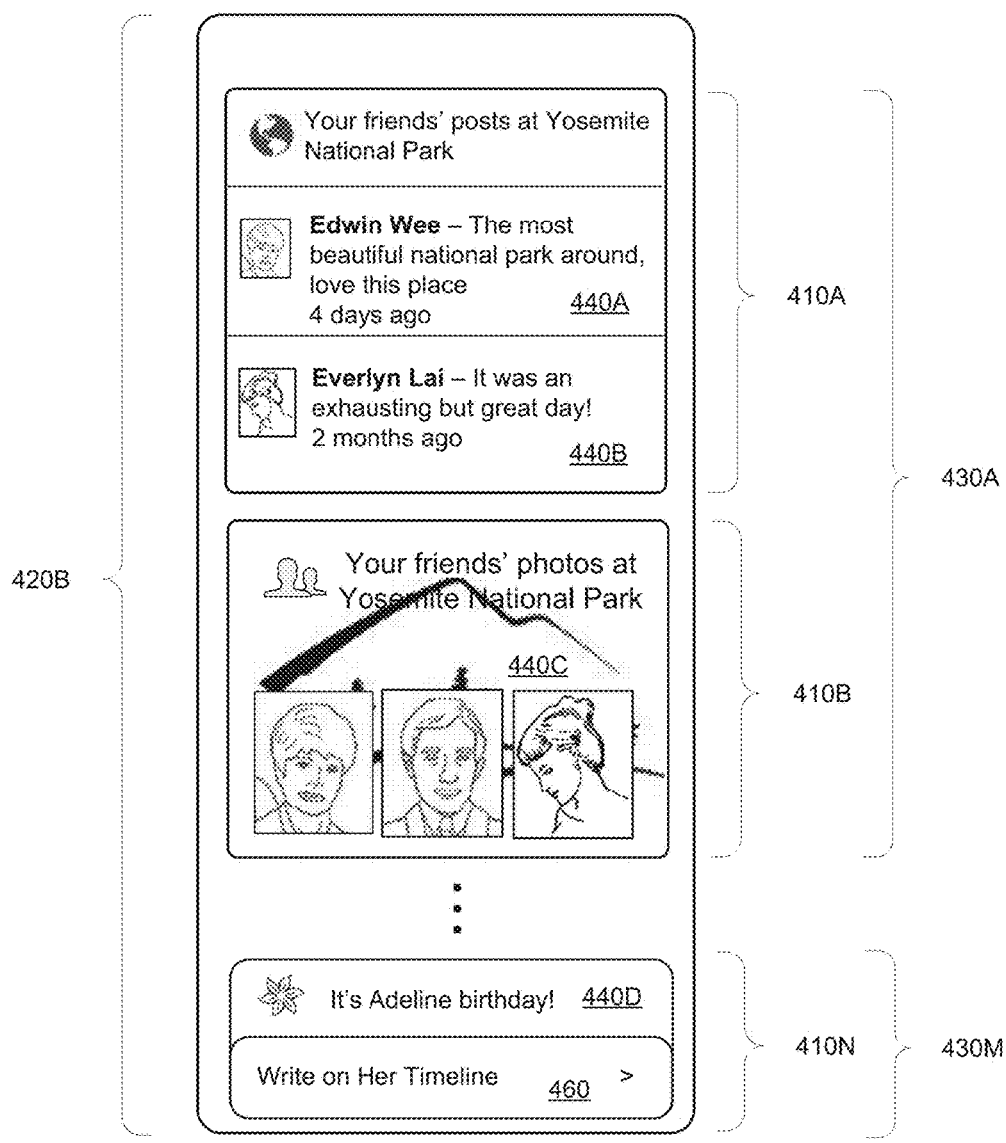
FIG. 4B illustrates an example page generated in response to the trigger action of FIG. 4A.

FIGS. 4A-4B illustrate example pages of an online social network. Specifically, FIG. 4A illustrates an example page for initiating an example trigger action, while FIG. 4B illustrates an example page generated in response to the trigger action of FIG. 4A. In particular embodiments, pages 420A-B may be shown on mobile client system 130. In the example of FIG. 4A, page 420A allows a user of the online social network to perform a trigger action of checking-in at Yosemite National Park. In particular embodiments, the user may check-in at Yosemite National Park by pressing or actuating "Check In" button 450. In the example of FIG. 4B, in response to the trigger action of FIG. 4A, one or more reaction-cards 410 may be displayed in page 420B of the online social network. In particular embodiments, page 420A may be refreshed by social-networking system 160 to display contents of page 420B. In particular embodiments, page 420B is a new page and may be shown substantially immediately upon the user pressing button 450. As an example and not by way of limitation, page 420B may be generated and stored by social-networking system 160 as the user's finger initiate contact with button 450 capacitively or physically. Once the user's finger is removed from button 450, page 420B is sent to mobile client system 130 for display to the user. As another example and not by way of limitation, structured data (for example, structured data comprising location of the user and one or more capabilities of the mobile client system 130) associated with the trigger action of page 420A may be transmitted to social-networking system 160 to determine one or more structured queries. The transmission of the structured data and the reaction-cards 410 (showing the structured query and its associated search results 440) for display on page 420B between social-networking system 160 and mobile client system 130 may be optimized depending on the availability and type of network 110 between social-networking system 160 and mobile client system 130. As an example and not by way of limitation, if network 110 comprises WI-FI network or telephone cellular network, cache priming may be utilized to send the structured data to social-networking system 160 to run dark structure queries and prime the caches of the social-networking system 160. As another example and not by way of limitation, if network 110 just comprises WI-FI network, the reaction-cards 410 may be pre-fetched from social-networking system 160 for display on page 420B. In particular embodiments, page 420B may present one or more reaction-card clusters 430 where each reaction-card 410 may correspond to a recommendation that is personalized. As an example and not by way of limitation, each reaction-card cluster 430 may be associated with one or more reaction-cards 410 corresponding to a user's trigger action. As such, a plurality of reaction-card clusters 430 may be generated for a plurality of user's trigger actions. In the example of FIG. 4B, reaction-card cluster 430A as shown corresponds to the most recent user's trigger action while reaction-card cluster 430M as shown corresponds to an earlier user's trigger action. Although this disclosure describes and illustrates particular trigger action, the disclosure contemplates any suitable trigger action. Moreover, although this disclosure describes and illustrates a particular page for displaying one or more reaction-cards in response to a particular trigger action in a particular manner, the disclosure contemplates any suitable page for displaying the one or more reaction-cards in response to any suitable trigger action in any suitable manner. As an example and not by way of limitation, a page may display one or more horizontal rows where each horizontal row comprises one or more reaction-cards 410 or one or more reaction-card clusters 430. Accordingly, the user may perform a horizontal scroll in order to search for and view a particular reaction-card 410. As discussed above, reaction-card cluster 430A comprising reaction-cards 410A-B may be displayed on page 420B in response to the user performing a trigger action of checking-in at the Yosemite National Park. Furthermore, reaction-card cluster 430M comprising reaction-card 410N may be displayed at the bottom of page 420B. In the example of FIG. 4B, reaction-card 410N may correspond to an earlier user's trigger action. Each reaction-card 410 may then include one or more search results 440 that correspond to the suggested query associated with the reaction-card 410. In particular embodiments, each reaction-card 410 may be associated with a suggested query referencing one or more nodes or edges of social graph 200. The reaction-card 410 may also display one or more search results matching the suggested query. As an example and not by way of limitation, each reaction-card 410 may include search results that substantially match the suggested query associated with the reaction-card 410, wherein each search results comprises a reference to a node of the plurality of nodes of social graph 200. In particular embodiments, these second nodes may not include a first node corresponding to the user who performs the trigger action. In other words, the reaction-card 410 may exclude from the search results content generated by the acting user. Thereof, social-networking system 160 may then generate one or more reaction-card clusters 430 with one or more reaction-cards 410 corresponding to the identified content which may be sent to the user. As an example and not by way of limitation, referencing FIG. 4B, in response to the trigger action of checking-in at Yosemite National Park, social-networking system 160 may generate a search query "My friends' posts at Yosemite National Park," where "My friends," "posts," and "Yosemite National Park" in the search query are references corresponding to particular social-graph elements (i.e. one or more second user nodes corresponding to friends of the user, a friend-type edge 206, a post-type edge 206, and concept node 204 corresponding to the location "Yosemite National Park") that do not include a first user node corresponding to the user who performs the trigger action. Accordingly, reaction-card 410A comprising the search query "My friends' posts at Yosemite National Park" and search results 440A-B corresponding to the search query may be displayed. In particular embodiments, an initial reaction-card cluster 430 may include one or more reaction-cards 410 without any filtering. Although this disclosure describes and illustrates particular reaction-cards 410 being generated in response to a particular user checking-in at the Yosemite National Park, the disclosure contemplates any suitable reaction-cards being generated in response to any user checking-in at any suitable location. As an example and not by way of limitation, at least one reaction-card 410 may be generated that includes a crowdsourcing UI for the user to enter missing data or update data about the particular location that the user checks in. In particular embodiments, the data may include hours of operation, ratings/reviews, or parking fees.

As illustrated in the example of FIGS. 4 and 5, the results of the suggested query may be presented to the user, in the form of one or more reaction-cards 410, each reaction-card having one or more search results 440 that may include one or more links or hyperlinks, one or more snippets, or both. Each link may be associated with a different page that contains some of the identified resources or content. In particular embodiments, each link in reaction-cards 410 may be in the form of a Uniform Resource Locator (URL) that specifies where the corresponding page is located and the mechanism for retrieving it. Social-networking system 160 may then send the one or more reaction-cards 410 (e.g., as a reaction-card cluster 430) to the web browser 132 on the user's client system 130. The user may then click on the URL links or otherwise select the content of reaction-cards 410 to access the content from social-networking system 160 or from an external system (such as, for example, a third-party system 170), as appropriate.

As described above, each search result may comprise one or more snippets. A snippet is contextual information about the target of the search result. In other words, a snippet provides information about that page or content corresponding to the search result. As an example and not by way of limitation, a snippet may be a sample of content from the profile page (or node) corresponding to the search result. Snippets may be used to display key information about a search result, such as image thumbnails, summaries, document types, page views, comments, dates, authorship, ratings, prices, or other relevant information. In particular embodiments, a snippet for a search result corresponding to users/concepts in an online social network may include contextual information that is provided by users of the online social network or otherwise available on the online social network. As an example and not by way of limitation, a snippet may include one or more of the following types of information: privacy settings of a group; number of members in a group; sponsored messages (e.g., an inline ad unit rendered as a snippet); page categories; physical address; biographical details; interests; relationship status; sexual orientation/preference; sex/gender; age; birthday; current city; education history; political affiliations; religious beliefs; work history; applications used; comments; tags; other suitable contextual information; or any combination thereof. In particular embodiments, a snippet may include references to nodes or edges from the social graph 200. These snippets may be highlighted to indicate the reference corresponds to a social-graph element. Although this disclosure describes particular types of snippets, this disclosure contemplates any suitable types of snippets. In connection with search results and snippets particular embodiments may utilize one or more systems, components, elements, functions, methods, operations, or steps disclosed in U.S. patent application Ser. No. 13/731,939, filed 31 Dec. 2012, which is incorporated by reference.

In particular embodiments, reaction-cards 410 of each reaction-card cluster 430 may be ranked and presented to the user according to their inferred relative degrees of relevance to the user, the user's trigger action, and one or more user-engagement factors. In particular embodiments, the relevance of each reaction-card 410 may be associated with the relevance of a suggested query associated with the reaction-card 410. Herein, a relevance of a reaction-card 410 may encompass a relevance of a search query associated with the reaction-card 410, or vice-versa, where appropriate. In particular embodiments, when inferring the relative degrees of relevance based on the user's trigger action, social-networking system 160 may identify a particular second node of social graph 200 to be associated with the user's trigger action. Accordingly, a relative degree of relevance for the reaction-card 410 may be determined at least by a relevance of the one or more second nodes being referenced by the reaction-card 410 to the particular second node being identified by social-networking system 160 to be associated with the user's trigger action. In particular embodiments, the particular second node being identified by social-networking system 160 to be associated with the user's trigger action is the node being referenced by the suggested query associated with the reaction-card 410. Moreover, reaction-cards 410 may be personalized for the user based on, for example, social-graph information, user information, search or browsing history of the user, or other suitable information related to the user. In particular embodiments, the reaction-cards may be ranked using a ranking algorithm. The ranking algorithm may be implemented by social-networking system 160 (for example, by the search engine or by another suitable system) in any suitable manner. As an example and not by way of limitation, reaction-cards that are more relevant may be ranked higher than the reaction-cards that are less relevant. In particular embodiments, the ranking algorithm may be based on one or more ranking heuristics such as, for example, limiting the number of reaction-cards that are displayed, limiting the number of search results displayed in each reaction-card, having mutual exclusivity for reaction-cards that have substantially similar content, preventing repeated displays of reaction-cards with substantially similar search queries and/or search results, other suitable heuristics, or any combination thereof. As an example and not by way of limitation, in response to a trigger action of a user posting the message "I am watching The Grand Budapest Hotel" to the user's wall on the online social network, social-networking system 160 may not display a reaction-card whose search results include posts that are substantially similar to "I am watching The Grand Budapest Hotel" by other users. As another example, referencing the trigger action of the user posting the message "I am watching The Grand Budapest Hotel," social-networking system 160 may not display a reaction-card whose search results include one or more follow-up posts on the movie "The Grand Budapest Hotel" by the user. In particular embodiments, social-networking system 160 may lower the ranking scores of the reaction-cards in these examples relative to other reaction-cards generated in response to the user's trigger action. In particular embodiments, reaction-cards 410 corresponding to suggested queries may be presented to the user in a ranked order, such as, for example, based on a rank previously determined as described above. Furthermore, in particular embodiments, reaction-cards 410 corresponding to suggested queries above a threshold rank may be sent or displayed to the user. In particular embodiments, the search engine may limit its search to resources and content on the online social network. However, in particular embodiments, the search engine may also search for resources or contents on other sources, such as a third-party system 170, the Internet or World Wide Web, or other suitable sources. Although this disclosure describes querying social-networking system 160 in a particular manner, this disclosure contemplates querying social-networking system 160 in any suitable manner.

In particular embodiments, one or more reaction-cards 410 displayed on page 420B may be modified in response to text entered in association with a trigger action such as for example, posting a message on the online social network. In particular embodiments, one or more client-side and/or backend (server-side) processes may implement and utilize a "typeahead" feature that may automatically modify the suggested query to include terms relevant to the user, the user's trigger action, one or more user-engagement factors, and the text currently being entered by a user into the text field (for example, text field 550). In particular embodiments, as a user is entering text into the text field, the typeahead feature may attempt to match the string of textual characters being entered in the declaration to strings of characters (e.g., names, descriptions) corresponding to user, concepts, or edges and their corresponding elements in the social graph 200. In particular embodiments, when a match is found, the typeahead feature may automatically populate the suggested query with a reference to the social-graph element (such as, for example, the node name/type, node ID, edge name/type, edge ID, or another suitable reference or identifier) of the existing social-graph element. As an example and not by way of limitation, if a user types in "food" or "restaurants," one or more reaction-cards 410 may be displayed on page 420 that incorporate some typeahead suggestions such as "Restaurants in . . . " while letting the user continue typing. Furthermore, a [Restaurants] reaction-card (e.g. 410) may be moved to the top of a reaction-card cluster 430 and one or more non-food related reaction-cards (e.g. 410), such as for example "What's on TV" may be moved to the bottom of page 420. The user may then navigate through one or more search results 440 in the [Restaurant] reaction-card as a personalized list of restaurant recommendations. More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to text entered by a user. As an example and not by way of limitation, as a user enters text characters into a text field (for example, text field 550), a typeahead process may attempt to identify one or more user nodes 202, concept nodes 204, or edges 206 that match the string of characters entered into the text field as the user is entering the characters. As the typeahead process receives requests or calls including a string or n-gram from the text entry, the typeahead process may perform or causes to be performed a modified suggested query to identify existing social-graph elements (i.e., user nodes 202, concept nodes 204, edges 206) based at least in part on the respective names, types, categories, or other identifiers matching the entered text along with information associated with the user, the user's trigger action, and one or more user-engagement factors. The typeahead process may use one or more matching algorithms to attempt to identify matching nodes or edges and process the modified suggested query that incorporates the identified nodes or edges. In response to the modified suggested query, social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to text entries in a particular manner, this disclosure contemplates applying the typeahead processes to text entries in any suitable manner.

In particular embodiments, social-networking system 160 may display one or more subsequent reaction-cards 410 to the user in response to receiving an input from the user corresponding to an interaction of a previous-displayed reaction-card 410. The subsequent reaction-cards 410 may correspond to modified search queries based on the input from the user. The interaction of the previously-displayed reaction-card 410 may comprise clicking on a URL of a search result, clicking on a picture of a second user as shown next to a search result 440C, writing on the timeline next to search result 440D, clicking on the group picture as shown in search result 540N, or any other suitable user's initiated trigger action. As an example and not by way of limitation, referencing FIG. 4B, the user may initiate a trigger action by writing on Adeline's timeline 460. As described above, social-networking system 160 may parse the n-gram of the text as written on Adeline's timeline, and modify the existing search queries to include one or more new search queries where each new search query may include references to one or more of the identified nodes or one or more of the identified edges 206. Accordingly, one or more new reaction-cards 410 may be displayed to the user corresponding to the modified search queries. In particular embodiments, even though the new search queries may be different, the subsequent reaction-cards 410 may have the same query-domain as the previously-displayed reaction-card 410. As an example and not by way of limitation, social-networking system 160 may re-trigger a previously-displayed reaction-card 410 by displaying one or more subsequent reaction-cards 410 that allow the user to discover more content associated with the previously-displayed reaction-card 410 that has been dismissed. The option to re-trigger a previously-displayed reaction-card 410 may be shown in a dialog box next to the reaction-card 410 (for example, the dialog box may appear when the user clicks on a pre-determined portion of the reaction-card 410). In particular embodiments, the subsequent reaction-cards 410 may have different search queries and different query-domain as the previously-displayed reaction-card 410. Although this disclosure describes displaying one or more subsequent reaction-cards 410 in response to a particular user's interaction of a previously-displayed reaction-card 410, this disclosure contemplates displaying any suitable reaction-cards 410 in response to any suitable user's interaction of any suitable previously-displayed reaction-card 410.

In particular embodiments, new reaction-cards 410 comprising new search results 440 may be generated by social-networking system 160 in response to an indication that the user is initiating the trigger action. Once the trigger action is completed, social-networking system 160 may sent the new reaction-cards 410 to the user on client system 130 for display to the user. As an example and not by way of limitation, referencing FIG. 4A, reaction-cards 410A-B may be generated and stored by social-networking system 160 as the user's finger initiate contact with button 450 capacitively or physically. Once the user's finger is removed from button 450, reaction-cards 410A-B may be sent to mobile client system 130 for display to the user.

Figure 5A:
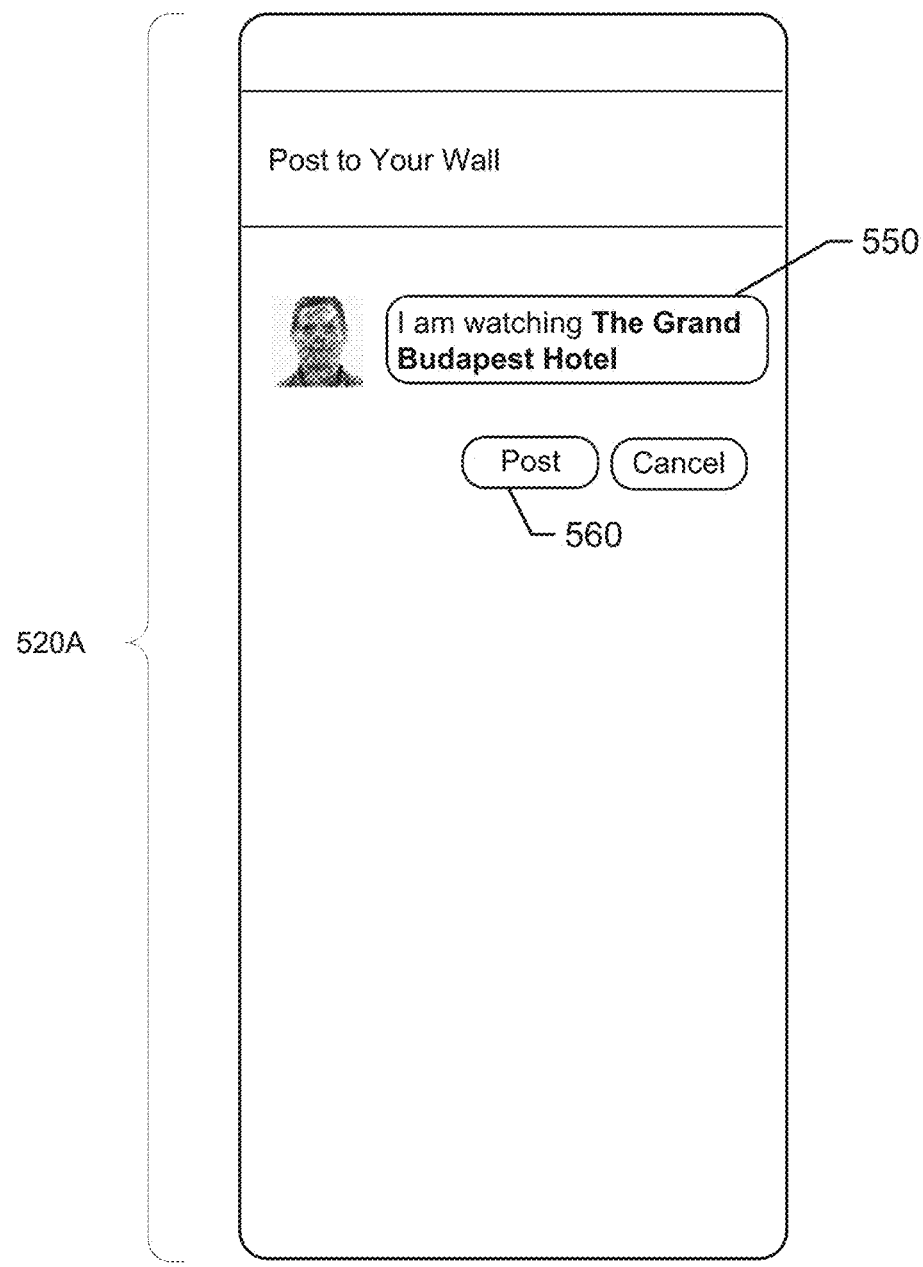
FIG. 5A illustrates an example page for initiating another example trigger action.
Figure 5B:
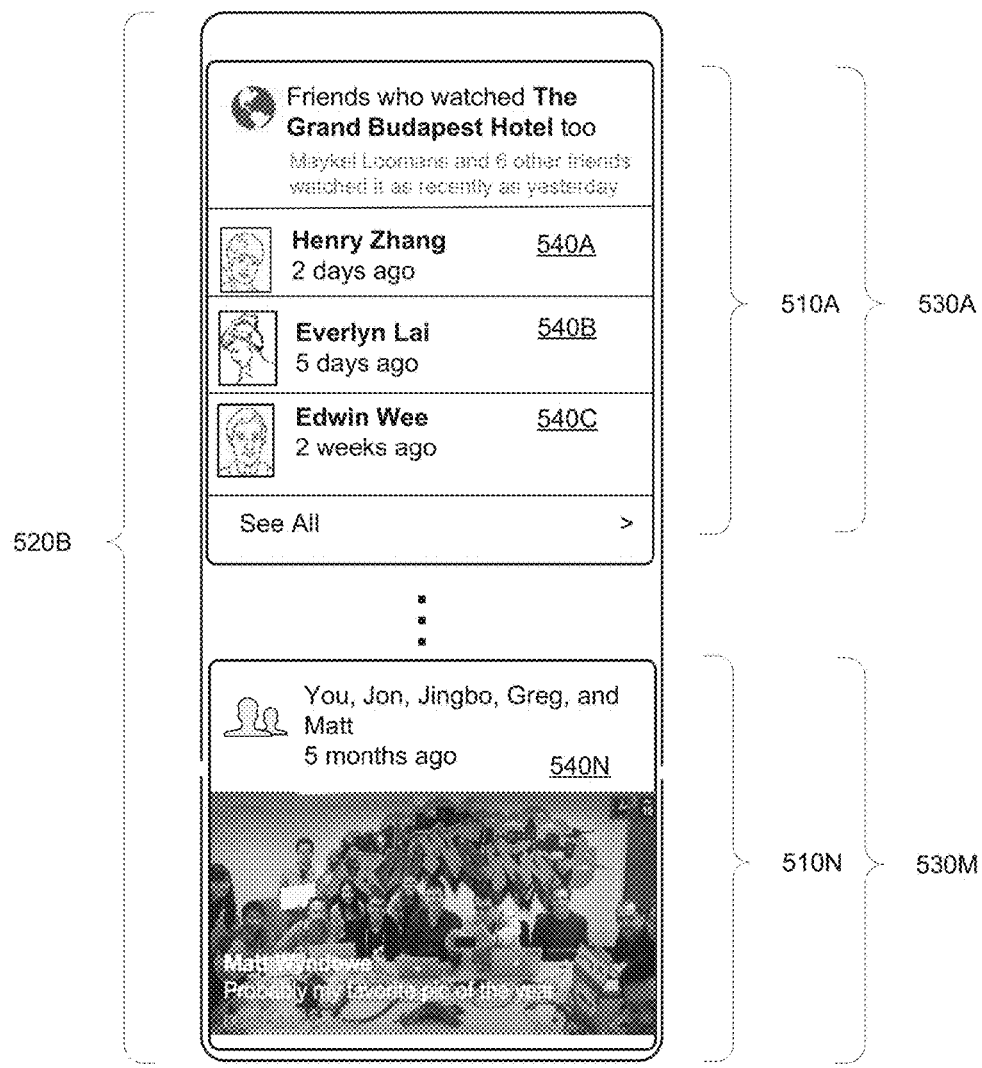
FIG. 5B illustrates an example page generated in response to the trigger action of FIG. 5A.

FIGS. 5A-5B illustrate other example pages of an online social network. Specifically, FIG. 5A illustrates an example page for initiating another example trigger action, while FIG. 5B illustrates an example page generated in response to the trigger action of FIG. 5A. In particular embodiments, pages 520A-B may be shown on mobile client system 130. In the example of FIG. 5A, page 520A may allow a user of the online social network to perform a trigger action of posting a message "I am watching The Grand Budapest Hotel" to the user's wall on the online social network. In the example of FIG. 5B, in response to the message as posted in FIG. 5A, one or more reaction-cards 510 may be displayed in page 520B of the online social network. In particular embodiments, page 520A may be refreshed by social-networking system 160 to display contents of page 520B, as described above. In particular embodiments, page 520B is a new page and may be shown substantially immediately upon the user pressing button 560. As an example and not by way of limitation, page 520B may be generated and stored by social-networking system 160 as the user types the posted message in text field 550. Once the user's presses button 560, page 520B is sent to mobile client system 130 for display to the user. In particular embodiments, page 520B may present one or more reaction-card clusters 530 where each reaction-card 510 may correspond to a recommendation that is personalized and each reaction-card cluster 530 may correspond to one or more search queries corresponding to the user's trigger action. As such, a plurality of reaction-card clusters 530 may be generated for a plurality of user's trigger actions. In the example of FIG. 5B, reaction-card cluster 530A as shown corresponds to the most recent user's trigger action (i.e. user's posted message "I am watching The Grand Budapest Hotel") while reaction-card cluster 530M and reaction-card 510N as shown correspond to an earlier user's posted comment involving the user's friends (i.e. Jon, Jingbo, Greg, and Matt). Furthermore, as illustrated by FIG. 5B, reaction-card 510A displays a plurality of search results 540A-C (i.e. friends of the user) who had watched the movie "The Grand Budapest Hotel" before, along with corresponding snippets showing the number of days or weeks in the past each person had watched the movie. At the same time, reaction-card 510N, as displayed at the bottom page 520B, shows search result 510N corresponding to a picture where the user's tagged friends (i.e. Jon, Jingbo, Greg, and Matt) were tagged, along with a snippet showing comment "Probably my favorite pic of the year" by one of tagged user's friends (i.e. Matt). Although this disclosure describes and illustrates particular trigger action, the disclosure contemplates any suitable trigger action. Moreover, although this disclosure describes and illustrates particular page for posting messages to a particular user's profile on an online social network, the disclosure contemplates any suitable page for posting any suitable messages to any suitable user's profile on any suitable online social network in any suitable manner. Furthermore, although this disclosure describes and illustrates a particular page for displaying one or more particular reaction-cards in response to a particular trigger action in a particular manner, the disclosure contemplates any suitable displaying the one or more reaction-cards in response to any suitable trigger action in any suitable manner.

Figure 6:
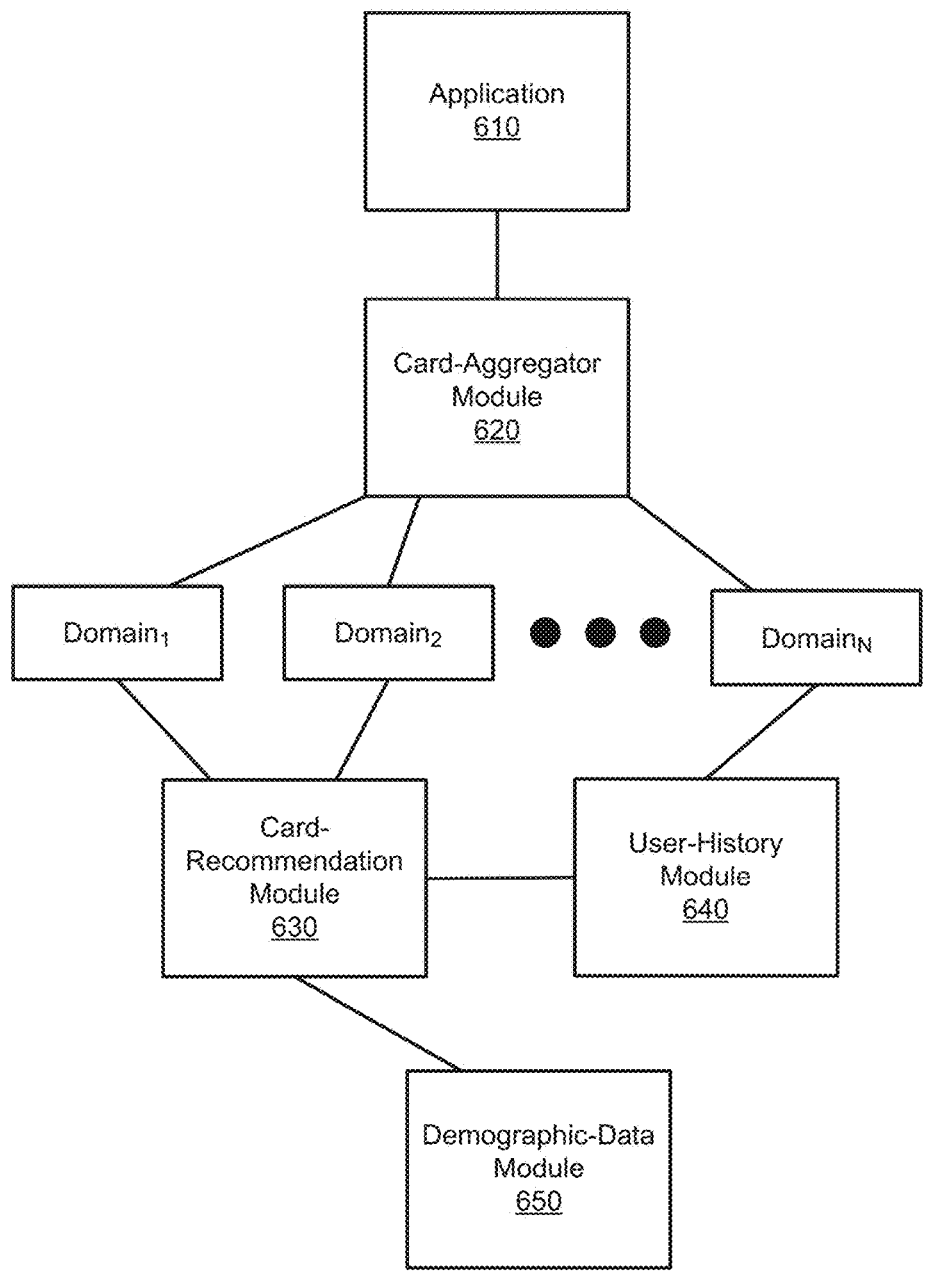
FIG. 6 illustrates example modules to generate example reaction-cards.

FIG. 6 illustrates example modules to generate example reaction-cards. Although FIG. 6 illustrates a particular configuration of particular modules that have particular functions, this disclosure contemplates any suitable configuration of modules of any suitable modules that may have any suitable function or combination of functions. As described above, social-networking system 160 may generate reaction-cards 410 based on information of the user, such as for example current location of the user or the time of day. In particular embodiments, an application 610 executed on a client system 130 or social-networking system 160 may send information of the user to a card-generation module 620. In particular embodiments, social-networking system 160 may use information associated with social graph 200, non-social graph information, or any combination thereof to generate one or more reaction-cards 410. As an example and not by way of limitation, geo-locations associated with "checked-ins" of the user may be a non-social graph of how users are connected to "places" or geo-locations, and how all of the places in the world are connected to each other through the users who have visited those geo-locations. In particular embodiments, application 610 may access current information associated with the user, such as for example, current location or time associated with the user. As an example and not by way of limitation, application 610 may determine the current location of the user through the location services of mobile client system 130 as described above. As another example, application 610 may determine the current location of the user through the Internet protocol (IP) or media access control (MAC) address of client system 130. In particular embodiments, the current information of the user accessed by application 610 may be sent to card-aggregator module 620. Card-aggregator module 620 may generate one or more suggested queries that then may be sent to domain modules $domain_1$-$domain_N$. Furthermore, card-aggregator module 620 may infer one or more search terms that may be auto-populated into the suggested query based on received information, such as for example the current location of the user or the time of day.

In particular embodiments, each domain module $domain_1$-$domain_N$ may correspond to a particular query-domain. As an example and not by way of limitation, each domain module $domain_1$-$domain_N$ may include a search index of a vertical of objects stored on social-networking system 160, as described below. The search index may be hosted by a respective index server comprising one or more computing devices (e.g., servers). As an example and not by way of limitation, the search index of each query-domain may reference objects (as well as social-graph data and other metadata associated with these objects) associated with a particular type of place (e.g., a movie theater, restaurant, landmark, or city), a particular type of entity (e.g., a person, business, group, sports team, or celebrity), a particular type of resource (e.g., an audio file, video file, digital photo, text file, structured document, post/comment on the online social network, or application, including references to social-graph entities associated with the resource, such as tags, links, check-ins, etc., or other types of structured data associated with the reference), a particular type real or intellectual property (e.g., a sculpture, painting, movie, game, song, idea, photograph, or written work), other suitable content objects, or any combination thereof. In particular embodiments, data stores or verticals may store objects of a social-networking system. In particular embodiments, each data store or vertical may store objects of a particular query-domain in a respective data storage device. As an example and not by way of limitation, a first vertical may store objects associated with movies; a second vertical may store objects associated with restaurants; a third vertical may store objects associated with landmarks. In particular embodiments, each object may have filter values that are metadata or attributes that describe particular query-filters that are characteristics of an object stored on social-networking system 160. As an example and not by way of limitation, example query-filters ["Genre" ], ["Cuisine" ], ["Location" ] may have associated example filter values ["Sci-Fi" ], ["Chinese" ] and ["Palo Alto" ], respectively.

In particular embodiments, the search results of the suggested query returned to card-aggregator module 620 may be modified by query-filters and associated filter values identified by card-recommendation module 630. In particular embodiments, card-recommendation module 630 may identify one or more query-filters relevant to the user from a pre-determined list of query-filters associated with each domain modules $domain_1$-$domain_N$. In particular embodiments, card-recommendation module 630 may store or access information related to information from social-graph 200 of the user, features of objects (e.g. a number of "likes" associated with an object), demographic information of the user, or any combination thereof. In addition, card-recommendation module 630 may access data associated with one or more objects (e.g. hours of operation, physical locations, or event times) stored on one or more third-party systems 170 to supplement the filter values of one or more objects stored on social-networking system 160. Furthermore, card-recommendation module 630 may identify one or more query-filters and associated filter values through identification of one or more edges connecting to one or more concept or user nodes of social-graph 200 of the user. In particular embodiments, card-recommendation module 630 may identify particular query-filters and associated filter values that may be relevant to the user by accessing information stored on user-history module 640 and demographic-data module 650 in combination with the data of card-recommendation module 630. As an example and not by way of limitation, card-recommendation module 630 may access activity of "friends" of the user and identify one or more query-filters and associated filter values based on the activity of the "friends." For example, a query-filter and associated filter value may be identified based on one or more "friends" of the user "liking" a particular content object, such as for example a particular movie or multiple movies of a particular genre. As another example, card-recommendation module 630 may identify one or more query-filters and associated filter values based on the activity of other users with at least a subset of similar demographic data as the user.

In particular embodiments, demographic-data module 650 may store demographic information of user through the user profile or social graph 200 described above. Example demographic information of the user may include gender, age, hometown, location of residence, school attended, organization membership, religious affiliation, level of education, relationship status, occupation, or any combination thereof. In particular embodiments, one or more query-filters and associated filter values may be identified by card-recommendation module 630 based at least in part on identifying edges to objects in social-graph 200 of other users with similar demographic information to the user stored on demographic-data module 650. As an example and not by way of limitation, card-recommendation module 630 may identify a particular query-filter (e.g. ["Genre" ]) having an associated filter value of (e.g. ["Sci-Fi" ]) based on other users having at least a subset of demographic information in common with the user, such as for example having the same level of education and occupation. In particular embodiments, card-recommendation module 630 may identify one or more query-filters and filter values for a particular query-domain based at least in part on a determination of whether the user is local or a tourist to the current location. As an example and not by way of limitation, the determination of whether the user is local or tourist of the current location may be based on comparing the current location of the user to hometown or location of residence information stored by demographic-data module 650. As another example, certain demographic information, such as, for example, a user's hometown, work, school, etc., may be derived from stored historic GPS or location data of the user. For example, if location data of the user indicates the user is at Menlo Park during working hours on most days, social-networking system may infer Menlo Park is the workplace of the user. Furthermore, inferred geo-locations of user may be stored in demographic-data module 650 and used by card-recommendation module 630 even if the user does not explicitly provide this information in their user profile. As another example, location data may be extracted from photos of the user to determine a geo-location associated with the user and infer the hometown of the user.

In particular embodiments, user-history module 640 may store social-graph information that may include the user's past activity within social-networking system 160 that may be represented as an edge connecting the node of the user to other nodes of the user's social-graph 200 as described above. As an example and not by way of limitation, user-history module 640 may include a check-in history or "like" history of the user. For example, card-recommendation module 630 may identify particular query-filters (e.g. ["Cuisine"] and ["Location"] and associated filter values ["Chinese"] and ["Palo Alto"], respectively, that are relevant to the user based at least in part on the user having multiple check-ins at one or more restaurants of a particular cuisine near his place of residence. As another example, card-recommendation module 630 may identify one or more query-filters and associated filter values based at least in part on a search history of the user stored on user-history module 640. In particular embodiments, user-history module 640 may include information associated with interactions of the user with previously displayed reaction-cards 410. As described below, one or more query-filters and associated filter values may be identified as being more or less relevant to the user based at least in part on interactions or lack of interaction by the user with reaction—cards 410 referencing the query-filters and associated filter values. In particular embodiments, card-recommendation module 630 may identify one or more query-filters for a particular query-domain based at least in part on a determination of whether the user is local or a tourist to the current location. As an example and not by way of limitation, the determination of whether the user is local or tourist of the current location may be based on the "check-in" or "likes" of the user stored by user-history module 640. In particular embodiments, the determination of whether the user is a local or tourist may be based on calculating a score based on information of the user stored by user-history module 640 or demographic-data module 650 as described above.

Card-recommendation module 630 may send the identified query-filters and associated filter value of the particular query-domains of the suggested query to domain modules $domain_1$-$domain_N$. Although this disclosure describes query-domains having a particular number of query-filters having a particular number of associated filter values, this disclosure contemplates query-domains having any suitable number of query-filters and associated filter values. In particular embodiments, query-filters may remove or ignore a subset of search results returned by domain modules $domain_1$-$domain_N$ based at least in part on the identified query-filters and associated filter values. As an example and not by way of limitation, for query-filter ["Rating"] and associated filter value ["4 Stars"] of the ["Restaurant'] query-domain, one or more objects associated with the ["Restaurant"] query-domain that are returned in response to the suggested query and have a ["4 Stars"] filter value for the ["Rating"] query-filter are sent to card-aggregator module 620.

As described above, card-aggregator module 620 may generate one or more reaction-cards 410 that reference one or more objects received from domain modules $domain_1$-$domain_N$ in response to the suggested query. In particular embodiments, a reaction-card score may be calculated for each reaction-card 410 based on an inferred degree of relevance of the search query associated with the reaction-card 410 to the user's trigger action, as described above. In particular embodiments, a reaction-card score may be calculated for each reaction-card 410 based on one or more user-engagement factors. In particular embodiments, the user-engagement factors may include one or more of social-graph information, demographic information, current information of the user, information associated with a mobile client device of the user, or any combination thereof, as described above. The reaction-card score may be, for example, a confidence score, a probability, a quality, a ranking, another suitable type of score, or any combination thereof. As an example and not by way of limitation, the reaction-card score for each reaction-card may represent a probability that the user will engage with the reaction-card. As another example, the reaction-card score may represent an estimate of the degree and depth of user interaction with reaction-cards 410 referencing particular objects against a clearly defined set of goals. As an example and not by way of limitation, calculating the reaction-card score may be based on previous user engagement with reaction-cards 410 referencing each query-domain, previous click-thru rate of reaction-cards 410 referencing each query-domain, the conversion-rate of particular reaction-cards 410 referencing each query-domain, preferences of the user, the search history of the user, the user's social-graph affinity for social-graph elements or objects referenced by reaction-cards 410, inferring the intent of the user, the current location of the user, the general or current popularity of the query-domain of reaction-cards 410 ("trending"), other suitable factors, or any combination thereof. As an example and not by way of limitation, preferences of the user may specify, for example, suggested queries or types of suggest queries of interest or not of interest to the user. As an example and not by way of limitation, social-networking system 160 may identify reaction-cards 410 that correspond to suggested queries or reference query-domains/filters preferred by the user, as specified by a user-preference of the user, and calculate higher reaction-card scores for these reaction-cards 410 specified as being preferred by the user (similarly, reaction-cards 410 corresponding to suggested queries or suggested query-domains/filters specified as being not preferred may be scored lower or completely excluded/assigned null scores). As another example, the intent of the user may be inferred, and reaction-cards corresponding to suggested queries related to that intent may be generated and sent to the user. In particular embodiments, a reaction-card score may be calculated for each reaction-card 410 based on advertising sponsorship. As an example and not by way of limitation, a particular place or object that an advertiser wants to promote may be boosted or promoted inside a reaction-card 410 of reaction-card cluster 430 or as a single item reaction-card 410 for the user in their ranked reaction-cards. A reaction-card score of promoted reaction-card 410 may take into account a dynamic auction to offset the engagement "hit" incurred for displaying another reaction-card 410 that is potentially less engaging to users. Although this disclosure describes calculating the reaction-card scores of reaction-cards in a particular manner, this disclosure contemplates calculating the reaction-card scores of reaction-cards in any suitable manner.

Social-networking system 160 may send one or more reaction-cards 410 to the user. As an example and not by way of limitation, reaction-cards 410 may be sent as one or more reaction-card clusters 430. In particular embodiments, reaction-cards 410 may be displayed on a page currently accessed by the user. As an example and not by way of limitation, the page may be a profile page of social-network system 160 (e.g., a user-profile page of the querying user or another user, or a concept-profile page of a concept associated with the online social network), a newsfeed page of the online social network, a search-results page corresponding to a particular reaction-card, or another suitable page of the online social network. In particular embodiments, reaction-cards 410 may be displayed on a new page. In particular embodiments, each sent reaction-card 410 may have a reaction-card score greater than a reaction-card threshold for the user. After scoring reaction-cards 410, social-networking system 160 may then send only those reaction-cards 410 having a reaction-card score greater than the reaction-card threshold score. In particular embodiments, the sent reaction-cards 410 may be displayed with other associated reaction-cards 410 forming a reaction-card cluster 430 corresponding to the user's trigger action on the online social network. In particular embodiments, reaction-cards 410 corresponding to suggested queries having a reaction-card score greater than the reaction-card threshold score may automatically be pushed to a user. As an example and not by way of limitation, the sent reaction-cards may be added to an existing reaction-card cluster 430, or formed a new reaction-card cluster 430 to be displayed to the user. Reaction-cards 410 may be generated and scored, as described previously, and rather than displaying the reaction-cards in association with any user's trigger action, the reaction-card could be generated as a newsfeed store and displayed in a user's newsfeed in response to the user accessing a newsfeed page of the online social network, in a standalone application, or on a home screen of a client system.

Figure 7:
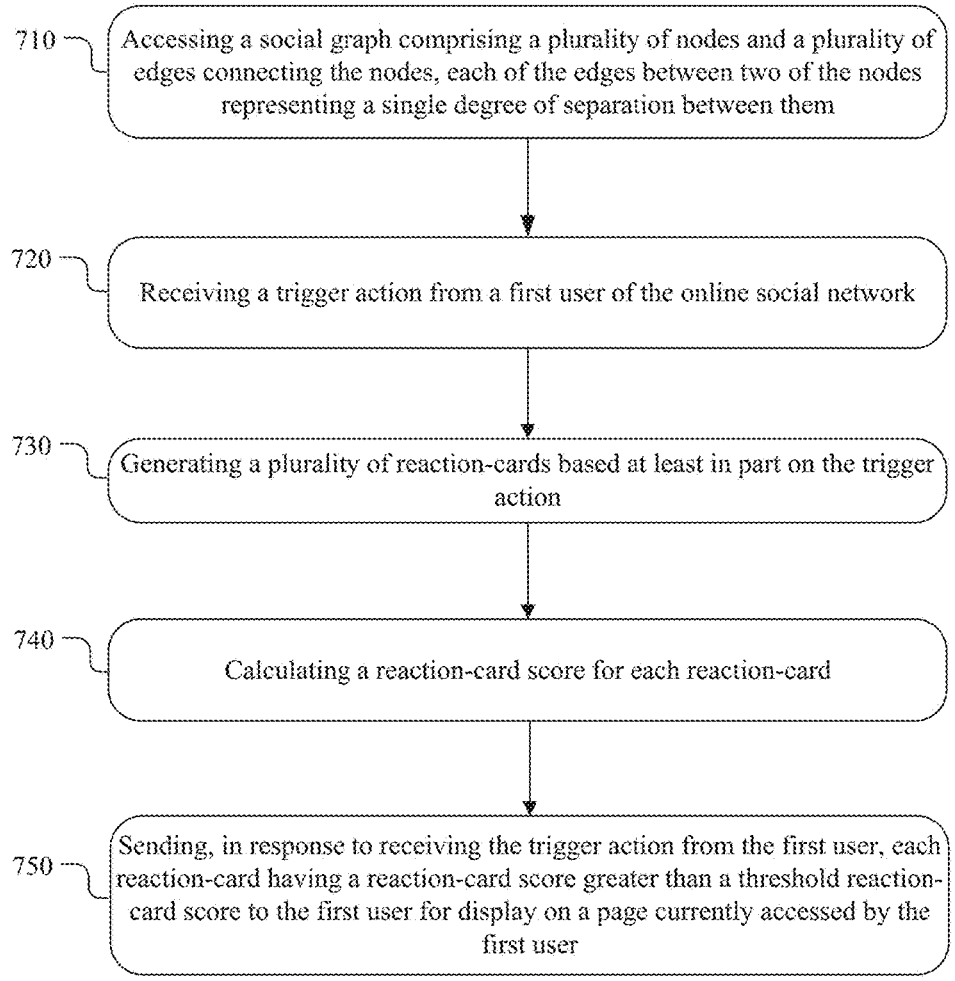
FIG. 7 illustrates an example method for generating reaction-cards in response to a user's trigger action.

FIG. 7 illustrates an example method 700 for generating reaction-cards in response to a user's trigger action associated with an online social network. The method may begin at step 710, where social-networking system 160 may access a social graph 200 comprising a plurality of nodes and a plurality of edges 206 connecting the nodes. Each of the edges between the two nodes may represent a single degree of separation between them. The nodes may comprise a first user node 202 corresponding to a first user associated with the online social network and a plurality of second nodes (one or more user nodes 202, concepts nodes 204, or any combination thereof) that each may correspond to a concept or a second user associated with the online social network. At step 720, social-networking system 160 may receive a trigger action from the first user of the online social network. In particular embodiments, the trigger action comprises a post, a comment, a check-in, a like, share, or any other suitable user's action associated with social-networking system 160. As an example and not by way of limitation, in response to the user's trigger action, social-networking system 160 may create an edge between the user node corresponding to the user and a second node in social graph 200. At step 730, social-networking system 160 may generate a plurality of reaction-cards based at least in part on the trigger action. Each reaction-card may be associated with a structured query referencing one or more of user node 202, concept node 204, and edge 206 of the social graph 200. Furthermore, each reaction-card may comprise references to one or more second nodes of the plurality of second nodes, respectively, matching the structured query associated with the reaction-card. At step 740, social-networking system 160 may calculate a reaction-card score for each reaction-card. The reaction-card score for each reaction-card may be based at least in part on a relevance of the structured query associated with the reaction-card to the trigger action, as discussed above. Furthermore, the reaction-card score for each reaction-card may be based on one or more user-engagement factors, as discussed above. At step 750, social-networking system 160 may send, in response to receiving the trigger action from the first user, each reaction-card having a reaction-card score greater than a threshold reaction-card score to the first user for display on a page currently accessed by the first user. In particular embodiments, each reaction-card may be shown substantially immediately to the receipt of the trigger action from the first user, as described above. In particular embodiments, the reaction-card may be shown after almost every trigger action of the first user. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for generating reaction-cards in response to a user's trigger action associated with an online social network including the particular steps of the method of FIG. 7, this disclosure contemplates any suitable method for generating any suitable reaction-cards in response to any suitable user's trigger action associated with any suitable online social network including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action (or may be used as an input to calculate such a probability). In this way, a user's future actions may be predicted based on the user's prior actions, where the coefficient may be calculated at least in part on a history of the user's actions. This predicted probability represented by the coefficient may be different than the probabilities used to score search queries or reaction-cards discussed previously, may be used as a factor in calculating those probabilities, or may be directly used for those probabilities, as appropriate. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user. In particular embodiments, the coefficient of a user towards one or more objects may be based on the geographic proximity of the objects (e.g., to the user and/or each other) and the user's interactions with the objects. As an example and not by way of limitation, a pair of geo-locations that are sequentially visited by the user, such as for example, a restaurant and a nearby movie theater may be considered to be of more interest to each other than unrelated geo-locations.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more pages, in one or more e-mails, or in connection with search results requested by a user). In addition or as an alternative, an advertisement may be one or more sponsored stories (e.g. a newsfeed or ticker item on social-networking system 160), or may be one or more sponsored queries (e.g., a suggested query referencing a particular object). A sponsored story or query may include a reference to a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes by, for example, having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted.

In particular embodiments, an advertisement may be requested for display within social-networking-system pages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user. As an example and not by way of limitation, advertisements may be included among the search results of a search-results page, where sponsored content is promoted over non-sponsored content. As another example and not by way of limitation, advertisements may be included among suggested search queries, where suggested queries that reference the advertiser or its content/products may be promoted over non-sponsored queries.

An advertisement may include social-networking-system functionality that a user may interact with. For example, an advertisement may enable a user to "like" or otherwise endorse the advertisement by selecting an icon or link associated with endorsement. As another example, an advertisement may enable a user to search (e.g., by executing a query) for content related to the advertiser. Similarly, a user may share the advertisement with another user (e.g. through social-networking system 160) or RSVP (e.g. through social-networking system 160) to an event associated with the advertisement. In addition or as an alternative, an advertisement may include social-networking-system context directed to the user. For example, an advertisement may display information about a friend of the user within social-networking system 160 who has taken an action associated with the subject matter of the advertisement. As an example and not by way of limitation, a particular place or object that an advertiser wants to promote may be boosted or promoted inside a reaction-card 410 of reaction-card cluster 430 or as a single item reaction-card 410 for the user in their ranked reaction-cards. A ranking of promoted reaction-card 410 may take into account a dynamic auction to offset the engagement "hit" incurred for displaying another reaction-card 410 that is potentially less engaging to users. As another example, a sponsored reaction-card 410, not just a sponsored item may be displayed to the user. For example, a NETFLIX reaction-card 410 may correspond to only content available on NETFLIX or a STARBUCKS reaction-card 410 may be a "Starbucks Nearby" reaction-card 410 that may be displayed ahead of reaction-cards 410 corresponding to "Cafes Nearby."

Systems and Methods

Figure 8:
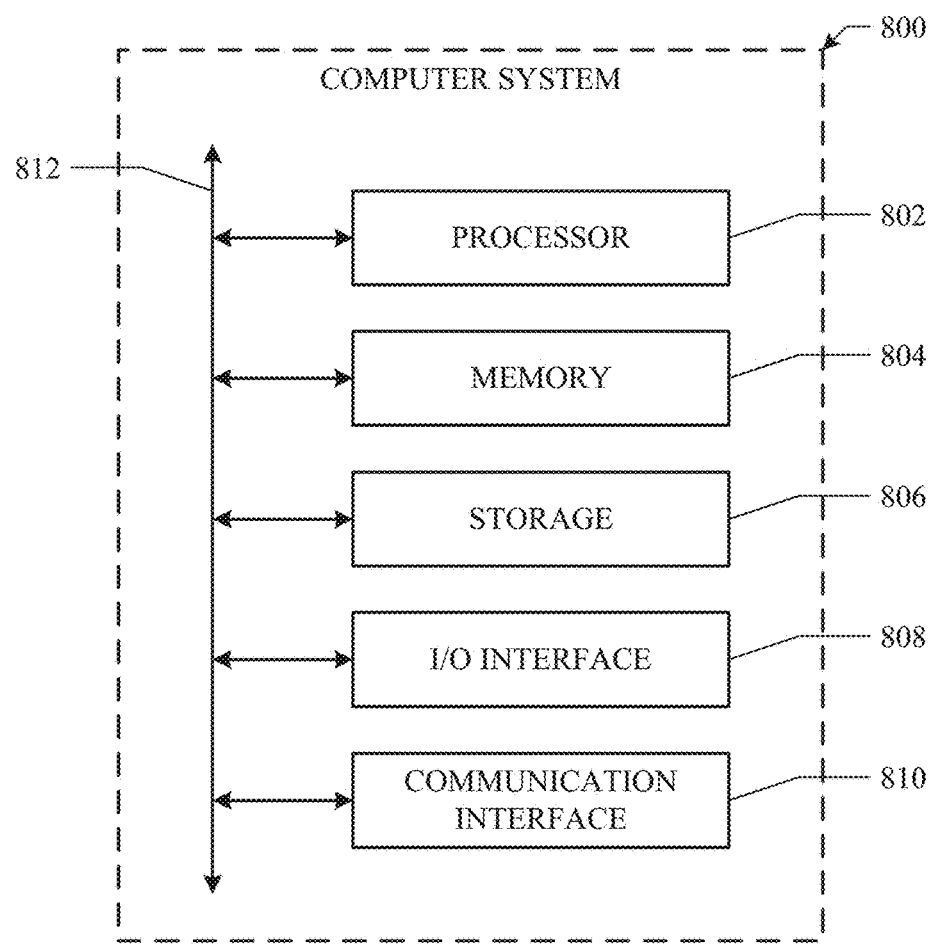
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing devices of an online social network:
   accessing, by one or more of the computing devices, a social graph comprising a plurality of nodes and a plurality of edges connecting the nodes, each of the edges between two of the nodes representing a single degree of separation between them, the nodes comprising:
   a first node corresponding to a first user associated with the online social network; and
   a plurality of second nodes that each correspond to a concept or a second user associated with the online social network;
   receiving, at one or more of the computing devices from a client system associated with a first user of the online social network, an indication of a trigger action performed on the client system, wherein the trigger action is a user interaction with a content object, the content object being associated with a particular node of the plurality of second nodes;
   generating, by one or more of the computing devices, a plurality of reaction-cards based at least in part on the trigger action, each reaction-card being associated with a structured query referencing the particular second node associated with the content object, each reaction-card comprising one or more search results referencing one or more second nodes of the plurality of second nodes, respectively, matching the structured query associated with the reaction-card;
   calculating, by one or more of the computing devices, a reaction-card score for each reaction-card, wherein the reaction-card score is based at least in part on a relevance of the structured query associated with the reaction-card to the trigger action and further based on one or more user-engagement factors;
   sending, from one or more of the computing devices to the client system, in response to receiving the trigger action from the first user, each reaction-card having a reaction-card score greater than a threshold reaction-card score to the first user for display on a page currently accessed by the client system;
   receiving, at one or more of the computing devices from the client system, an input from the first user, the input corresponding to an interaction with a first reaction-card of the plurality of reaction-cards; and
   sending, from one or more of the computing devices to the client system, instructions for displaying a second reaction-card to the first user in response to receiving the input from the first user, the second reaction-card being associated with a different structured query from that of the first reaction-card, wherein the structured query associated with the second reaction-card is generated by modifying the structured query associated with the first reaction-card based on the input from the first user.

2. The method of claim 1, wherein the relevance of the structured query associated with the reaction-card to the trigger action is based on a relevance of the reaction-card to the particular node associated with the content object.

3. The method of claim 1, wherein the trigger action is associated with a post, a comment, a check-in, a like, a share, a tag, particular structured data associated with the online social network, or any combination thereof.

4. The method of claim 1, wherein the trigger action is associated with an edge between the first node and the particular second node associated with the content object, the edge being created in response to the trigger action.

5. The method of claim 1, wherein each structured query corresponds to a query-domain.

6. The method of claim 5, wherein the query-domain is associated with places, people, groups, applications, events, or photos.

7. The method of claim 5, wherein the structured query associated with the second reaction-card corresponds to the same query-domain as the structured query associated with the first reaction-card.

8. The method of claim 1, further comprising receiving an indication that the first user is initiating the trigger action, and wherein generating the plurality of reaction-cards is responsive to receiving the indication that the first user is initiating the trigger action.

9. The method of claim 1, wherein the user-engagement factors comprise one or more of demographic information, current information, and social-graph information of the first user.

10. The method of claim 9, wherein the current information of the first user comprises one or more of a location history of the first user, personal preference of the first user, and a search history of the first user.

11. The method of claim 1, wherein the user-engagement factors comprise social-graph information of a second user in relation to one or more of the second nodes, the second user having at least a subset of demographic information in common with demographic information of the first user.

12. The method of claim 1, wherein the user-engagement factors comprise one or more of sensor information, current time, or one or more of capabilities of the mobile client device.

13. The method of claim 1, wherein the user-engagement factors comprise social-graph affinity of the first user with respect to one or more second nodes referenced by the structured query.

14. The method of claim 1, wherein a content object associated with each second node of the one or more second nodes of each reaction-card comprises references to one or more updates to the social graph.

15. The method of claim 1, wherein the page is a user interface of a native application associated with the online social network or a webpage of a social-networking system accessed by a browser client.

16. The method of claim 1, wherein each reaction-card comprises one or more links to content identified based on the structured query associated with the reaction card.

17. The method of claim 1, wherein each reaction-card comprises at least one interactive element, an interaction with which causes the client system to send an additional trigger action to the one or more computing devices of the online social network.

18. One or more computer-readable non-transitory storage media embodying software that is operable when executed to:
   access a social graph comprising a plurality of nodes and a plurality of edges connecting the nodes, each of the edges between two of the nodes representing a single degree of separation between them, the nodes comprising:
      a first node corresponding to a first user associated with an online social network; and
      a plurality of second nodes that each correspond to a concept or a second user associated with the online social network;
   receive, from a client system associated with a first user of the online social network, an indication of a trigger action performed on the client system, wherein the trigger action is a user interaction with a content object, the content object being associated with a particular node of the plurality of second nodes;
   generate a plurality of reaction-cards based at least in part on the trigger action, each reaction-card being associated with a structured query referencing the particular second node associated with the content object, each reaction-card comprising one or more search results referencing one or more second nodes of the plurality of second nodes, respectively, matching the structured query associated with the reaction-card;
   calculate a reaction-card score for each reaction-card, wherein the reaction-card score is based at least in part on a relevance of the structured query associated with the reaction-card to the trigger action and further based on one or more user-engagement factors;
   send, to the client system, in response to receiving the trigger action from the first user, each reaction-card having a reaction-card score greater than a threshold reaction-card score to the first user for display on a page currently accessed by the client system;
   receive, from the client system, an input from the first user, the input corresponding to an interaction with a first reaction-card of the plurality of reaction-cards; and
   send, to the client system, instructions for displaying a second reaction-card to the first user in response to receiving the input from the first user, the second reaction-card being associated with a different structured query from that of the first reaction-card, wherein the structured query associated with the second reaction-card is generated by modifying the structured query associated with the first reaction-card based on the input from the first user.

19. A system comprising: one or more processors; and a memory coupled to the processors comprising instructions executable by the processors, the processors operable when executing the instructions to:
   access a social graph comprising a plurality of nodes and a plurality of edges connecting the nodes, each of the edges between two of the nodes representing a single degree of separation between them, the nodes comprising:
      a first node corresponding to a first user associated with an online social network; and
      a plurality of second nodes that each correspond to a concept or a second user associated with the online social network;
   receive, from a client system associated with a first user of the online social network, an indication of a trigger action performed on the client system, wherein the trigger action is a user interaction with a content object, the content object being associated with a particular node of the plurality of second nodes;
   generate a plurality of reaction-cards based at least in part on the trigger action, each reaction-card being associated with a structured query referencing the particular second node associated with the content object, each reaction-card comprising one or more search results referencing one or more second nodes of the plurality of second nodes, respectively, matching the structured query associated with the reaction-card;
   calculate a reaction-card score for each reaction-card, wherein the reaction-card score is based at least in part on a relevance of the structured query associated with the reaction-card to the trigger action and further based on one or more user-engagement factors;
   send, to the client system, in response to receiving the trigger action from the first user, each reaction-card having a reaction-card score greater than a threshold reaction-card score to the first user for display on a page currently accessed by the client system;

receive, from the client system, an input from the first user, the input corresponding to an interaction with a first reaction-card of the plurality of reaction-cards; and send, to the client system, instructions for displaying a second reaction-card to the first user in response to receiving the input from the first user, the second reaction-card being associated with a different structured query from that of the first reaction-card, wherein the structured query associated with the second reaction-card is generated by modifying the structured query associated with the first reaction-card based on the input from the first user.

20. The method of claim 1, further comprising:

generating, by a card-aggregator module and responsive to the trigger action, a plurality of structured queries associated with the trigger action, each of the structured queries referencing the particular second node associated with the content object.

21. The method of claim 20, further comprising:

generating, by one or more domain modules and for each of one or more of the structured queries, one or more search results, wherein each of the search results corresponds to a second node connected to the particular second node referenced by the structured query by an edge of the structured query.

22. The method of claim 1, wherein the trigger action comprises an interaction by the first user with one or more elements of the page currently accessed by the client system.

23. The method of claim 22, wherein sending each reaction-card having a reaction-card score greater than a threshold reaction-card score to the first user comprises:

sending, to the client system, instructions to refresh the page currently accessed by the client system to display an updated page on the client system, the updated page comprising the sent reaction-cards.

24. The system of claim 19, wherein the relevance of the structured query associated with the reaction-card to the trigger action is based on a relevance of the reaction-card to the particular node associated with the content object.

25. The system of claim 19, wherein the trigger action is associated with a post, a comment, a check-in, a like, a share, a tag, particular structured data associated with the online social network, or any combination thereof.

26. The system of claim 19, wherein the trigger action is associated with an edge between the first node and the particular second node associated with the content object, the edge being created in response to the trigger action.

27. The system of claim 19, wherein each structured query corresponds to a query-domain.

28. The system of claim 27, wherein the query-domain is associated with places, people, groups, applications, events, or photos.

29. The system of claim 27, wherein the structured query associated with the second reaction-card corresponds to the same query-domain as the structured query associated with the first reaction-card.

30. The system of claim 19, wherein the processors are further operable when executing the instructions to:

receive an indication that the first user is initiating the trigger action, and wherein the instruction to generate the plurality of reaction-cards is executed responsive to receiving the indication that the first user is initiating the trigger action.

31. The system of claim 19, wherein the user-engagement factors comprise one nor more of demographic information, current information, and social-graph information of the first user.

32. The system of claim 31, wherein the current information of the first user comprises one or more of a location history of the first user, personal preference of the first user, and a search history of the first user.

33. The system of claim 19, wherein the user-engagement factors comprise social-graph information of a second user in relation to one or more of the second nodes, the second user having at least a subset of demographic information in common with demographic information of the first user.

34. The system of claim 19, wherein the user-engagement factors comprise one or more of sensor information, current time, or one or more of capabilities of the mobile client device.

35. The system of claim 19, wherein the user-engagement factors comprise social-graph affinity of the first user with respect to one or more second nodes referenced by the structured query.

36. The system of claim 19, wherein a content object associated with each second node of the one or more second nodes of each reaction-card comprises references to one or more updates to the social graph.

37. The system of claim 19, wherein the page is a user interface of a native application associated with the online social network or a webpage of a social-networking system accessed by a browser client.

38. The system of claim 19, wherein the processors are further operable when executing the instructions to:

generate, by a card-aggregator module and responsive to the trigger action, a plurality of structured queries associated with the trigger action, each of the structured queries referencing the particular second node associated with the content object.

39. The system of claim 38, wherein the processors are further operable when executing the instructions to:

generate, by one or more domain modules and for each of one or more of the structured queries, one or more search results, wherein each of the search results corresponds to a second node connected to the particular second node referenced by the structured query by an edge of the structured query.

40. The system of claim 19, wherein the trigger action comprises an interaction by the first user with one or more elements of the page currently accessed by the client system.

41. The system of claim 40, wherein the instructions to send each reaction-card having a reaction-card score greater than a threshold reaction-card score to the first user comprise instructions to:

send, to the client system, instructions to refresh the page currently accessed by the client system to display an updated page on the client system, the updated page comprising the sent reaction-cards.

42. The system of claim 19, wherein each reaction-card comprises one or more links to content identified based on the structured query associated with the reaction card.

43. The system of claim 19, wherein each reaction-card comprises at least one interactive element, an interaction with which causes the client system to send an additional trigger action to the one or more computing devices of the online social network.

* * * * *